United States Patent
Tsubouchi et al.

(10) Patent No.: US 10,082,427 B2
(45) Date of Patent: Sep. 25, 2018

(54) MEASUREMENT DATA COLLECTING SYSTEM, TERMINAL DEVICE, SERVER DEVICE, MEASUREMENT DATA COLLECTING METHOD, AND NON-TRANSITORY COMPUTER READABLE STORAGE MEDIUM

(71) Applicant: YAHOO JAPAN CORPORATION, Tokyo (JP)

(72) Inventors: Kota Tsubouchi, Tokyo (JP); Kentaro Nishi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/221,073

(22) Filed: Jul. 27, 2016

(65) Prior Publication Data

US 2017/0078397 A1 Mar. 16, 2017

(30) Foreign Application Priority Data

Sep. 16, 2015 (JP) ................. 2015-183145

(51) Int. Cl.

| | |
|---|---|
| *G01K 1/02* | (2006.01) |
| *H04W 4/02* | (2018.01) |
| *G01W 1/02* | (2006.01) |
| *H04W 4/38* | (2018.01) |
| *H04W 4/029* | (2018.01) |
| *G01W 1/00* | (2006.01) |

(52) U.S. Cl.
CPC ............... *G01K 1/024* (2013.01); *G01W 1/02* (2013.01); *H04W 4/023* (2013.01); *H04W 4/029* (2018.02); *H04W 4/38* (2018.02); *G01W 2001/006* (2013.01)

(58) Field of Classification Search
CPC ......... H04W 4/02; H04W 4/04; H04W 4/025; H04W 4/026; H04W 24/08; H04W 4/043; H04W 24/10; H04W 36/16; H04W 56/006; H04W 64/006; G01S 17/46; G01S 5/0294; G01S 5/14; H04L 63/1416; H04L 63/1433
See application file for complete search history.

(56) References Cited

U.S. PATENT DOCUMENTS

| | | | | |
|---|---|---|---|---|
| 2015/0163312 A1* | 6/2015 | Maguire | ............... | H04L 67/125 709/219 |
| 2015/0334678 A1* | 11/2015 | MacGougan | ........... | G01S 19/22 701/451 |

FOREIGN PATENT DOCUMENTS

| | | |
|---|---|---|
| JP | 2004-21778 A | 1/2004 |
| JP | 2013-218436 A | 10/2013 |
| JP | 2014-164383 A | 9/2014 |

OTHER PUBLICATIONS

Feb. 14, 2017 Office Action issued in Japanese Patent Application No. 2015-183145.

* cited by examiner

*Primary Examiner* — Kwasi Karikari
(74) *Attorney, Agent, or Firm* — Oliff PLC

(57) ABSTRACT

A measurement data collecting system includes a data receiving unit that receives first data measured by a first sensor and acquired at a mobile terminal, a measurement environment determining unit that determines environment of the mobile terminal when the first data is acquired based on second data measured by a second sensor and acquired at the mobile terminal. The measurement environment determining unit extracts first data in accordance with the environment from the first data received by the data receiving unit.

6 Claims, 14 Drawing Sheets

MEASUREMENT DATA COLLECTING SYSTEM, TERMINAL DEVICE, SERVER DEVICE, MEASUREMENT DATA COLLECTING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-183145 filed in Japan on Sep. 16, 2015.

BACKGROUND OF THE INVENTION

1. Field of the Invention

The present invention relates to a measurement data collecting system, a terminal device, a server device, a measurement data collecting method, and a non-transitory computer readable storage medium.

2. Description of the Related Art

In a conventional measurement data collecting system (what is called a cloud sensing system), measurement data obtained by measurement at each of a plurality of sensors is collected through a network and analyzed at a server device.

With this system, for example, atmospheric temperature data and atmospheric pressure data measured at various locations can be used to produce a weather forecast map, or body temperatures data measured by users living in different regions can be used to evaluate the epidemic state of an infectious disease.

In order to establish this system, it is effective to collect measurement data acquired through mobile terminals possessed by users. This is because a mobile terminal can be moved with a user to optional locations, thereby collecting measurement data acquired at various locations as well as collecting a large amount of measurement data.

However, a measurement environment varies between mobile terminals, and thus measurement data collected from mobile terminals possessed by users potentially includes measurement data obtained under inappropriate measurement environment.

For example, when outdoor atmospheric temperature data is to be collected, collected atmospheric temperature data potentially includes atmospheric temperature data measured by a mobile terminal possessed by a user at an indoor location where an air-conditioning machine is installed. Alternatively, when body temperature data of a user at rest is to be collected, collected body temperature data potentially includes body temperature data measured right after exercise.

If measurement data collected in this manner includes measurement data obtained under inappropriate measurement environment, this affects analysis at a server device. Thus, a measurement data collecting system established using mobile terminals is desirably configured to collect measurement data obtained under appropriate measurement environment in accordance with an analysis purpose.

SUMMARY OF THE INVENTION

It is an object of the present invention to at least partially solve the problems in the conventional technology.

According to one aspect of an embodiment, a measurement data collecting system includes a receiving unit that receives first data measured by a first sensor and acquired at a terminal device, and a determining unit that determines environment of the terminal device when the first data is acquired based on second data measured by a second sensor and acquired at the terminal device. The determining unit extracts first data in accordance with the environment from the first data received by the receiving unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments will be described below with reference to the accompanying drawings. In the present specification and drawings, components having effectively identical functional configurations are denoted by an identical reference sign, and any duplicate description is omitted.

First Embodiment

1. Entire Configuration of Measurement Data Collecting System

Figure 1:
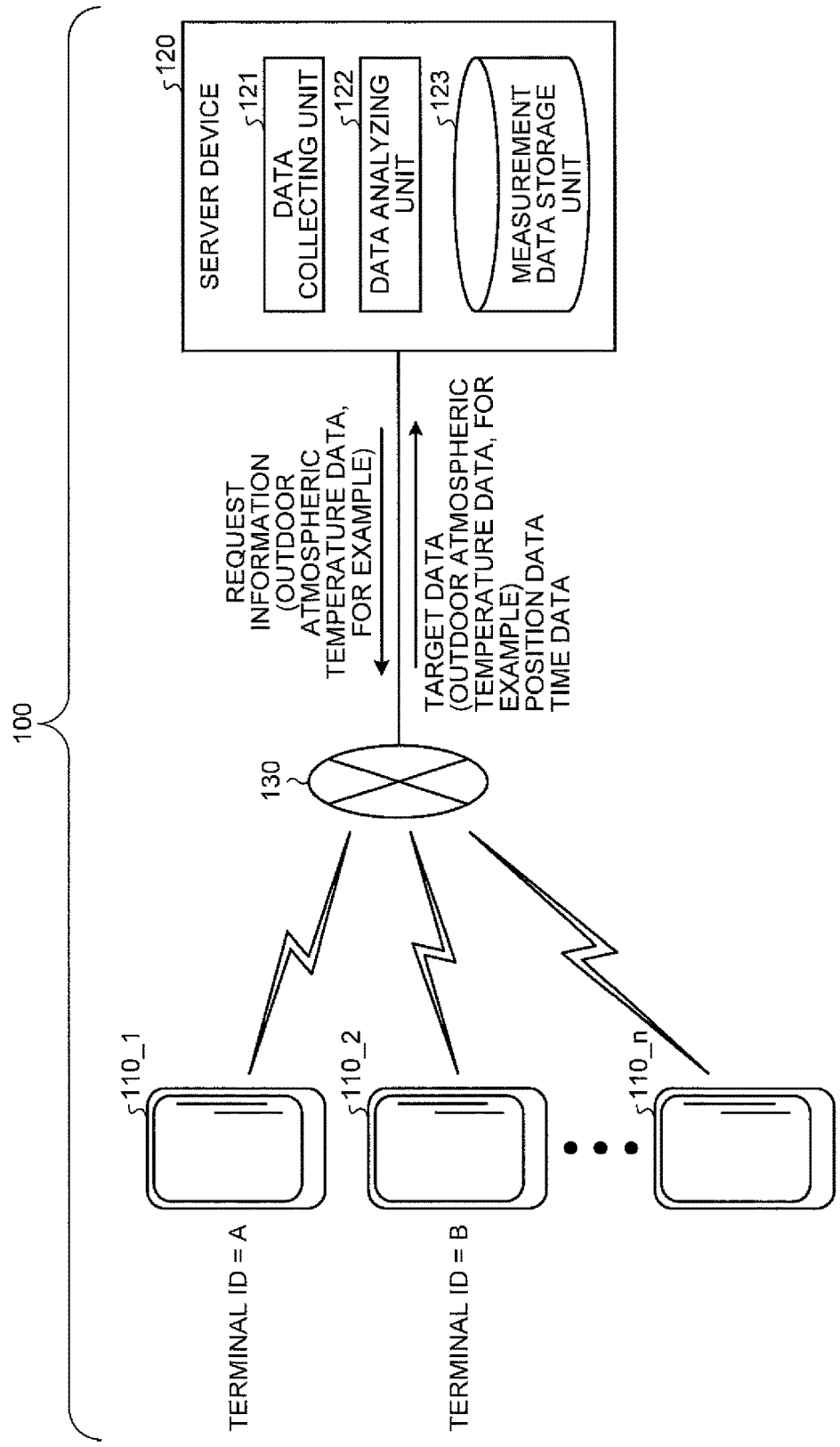
FIG. 1 is a diagram illustrating an exemplary entire configuration of a measurement data collecting system.

First, the entire configuration of a measurement data collecting system will be described. FIG. 1 is a diagram illustrating an exemplary entire configuration of the measurement data collecting system.

As illustrated in FIG. 1, this measurement data collecting system 100 includes a plurality of mobile terminals 110_1 to 110_n (n is a natural number equal to or larger than 2) and a server device 120. The mobile terminals 110_1 to 110_n and the server device 120 are connected with each other through a network 130 typified by the Internet and a local area network (LAN).

The mobile terminals 110_1 to 110_n are each an exemplary terminal device possessed by a user and include a measurement sensor to measure various pieces of data. For the purpose of illustration, in the following, a terminal ID of "A" is allocated to the mobile terminal 110_1, and a terminal ID of "B" is allocated to the mobile terminal 110_2.

The mobile terminals 110_1 to 110_n each acquire measurement data obtained by the built-in measurement sensor and transmit, to the server device 120, "target data" that is measurement data in accordance with request information from the server device 120.

When transmitting target data to the server device 120, the mobile terminals 110_1 to 110_n each determine the condition of the mobile terminal when the target data is acquired based on the acquired measurement data (measurement data other than the target data). Then, the mobile terminal determines, based on the condition of the mobile terminal, whether the target data is measured under appropriate measurement environment. The mobile terminal discards target data determined to be measured under inappropriate measurement environment. In this manner, the mobile terminals 110_1 to 110_n can transmit only target data measured under appropriate measurement environment to the server device 120.

At the transmission of the target data to the server device 120, the mobile terminals 110_1 to 110_n each additionally transmit position data indicating the position of the mobile terminal. At the transmission of the target data to the server device 120, the mobile terminals 110_1 to 110_n each additionally transmit time data indicating a time at which the target data is acquired by the mobile terminal.

This allows the server device 120 to analyze, based on the position data and the time data, the target data measured under appropriate measurement environment. Accordingly, an analyst can obtain various pieces of knowledge related to the target data.

A data collecting program and a data analyzing program are installed on the server device 120. The server device 120 executes these programs to serve as a data collecting unit 121 and a data analyzing unit 122.

The data collecting unit 121 receives the target data, the position data, and the time data transmitted from each of the mobile terminals 110_1 to 110_n, and stores these pieces of data in a measurement data storage unit 123.

The data analyzing unit 122 performs an analysis based on the target data, the position data, and the time data stored in the measurement data storage unit 123.

The example in FIG. 1 illustrates that the server device 120 transmits request information for measurement of outdoor atmospheric temperature data to the mobile terminals 110_1 to 110_n. Having received the request information, the mobile terminals 110_1 to 110_n each perform the measurement with a built-in temperature sensor to acquire atmospheric temperature data. The request information transmitted by the server device 120, however, designates outdoor atmospheric temperature data. Thus, the mobile terminals 110_1 to 110_n each determine whether the user possessing the mobile terminal is staying indoors or outdoors based on, for example, measurement data obtained by another built-in measurement sensor. Having determined that the user is staying outdoors, the mobile terminal determines that the acquired atmospheric temperature data is atmospheric temperature data measured under appropriate measurement environment (measurement data in accordance with an analysis purpose). Then, the mobile terminal transmits the acquired atmospheric temperature data together with the position data and the time data to the server device 120.

Accordingly, the server device 120 can collect, as outdoor atmospheric temperature data, atmospheric temperature data measured under appropriate measurement environment, thereby improving the accuracy of analysis at the server device 120. In addition, the server device 120 can generate, for example, an atmospheric temperature map and the like indicating atmospheric temperatures at various locations, by using the position data and the time data collected in association with the atmospheric temperature data. This allows the analyst to obtain useful knowledge based on the atmospheric temperature map and the like.

2. Hardware Configuration of Mobile Terminal

The following describes a hardware configuration of each of the mobile terminals 110_1 to 110_n. In the present embodiment, the mobile terminals 110_1 to 110_n all have the same hardware configuration. In the following, the hardware configuration of the mobile terminal 110_1 will be described.

Figure 2:
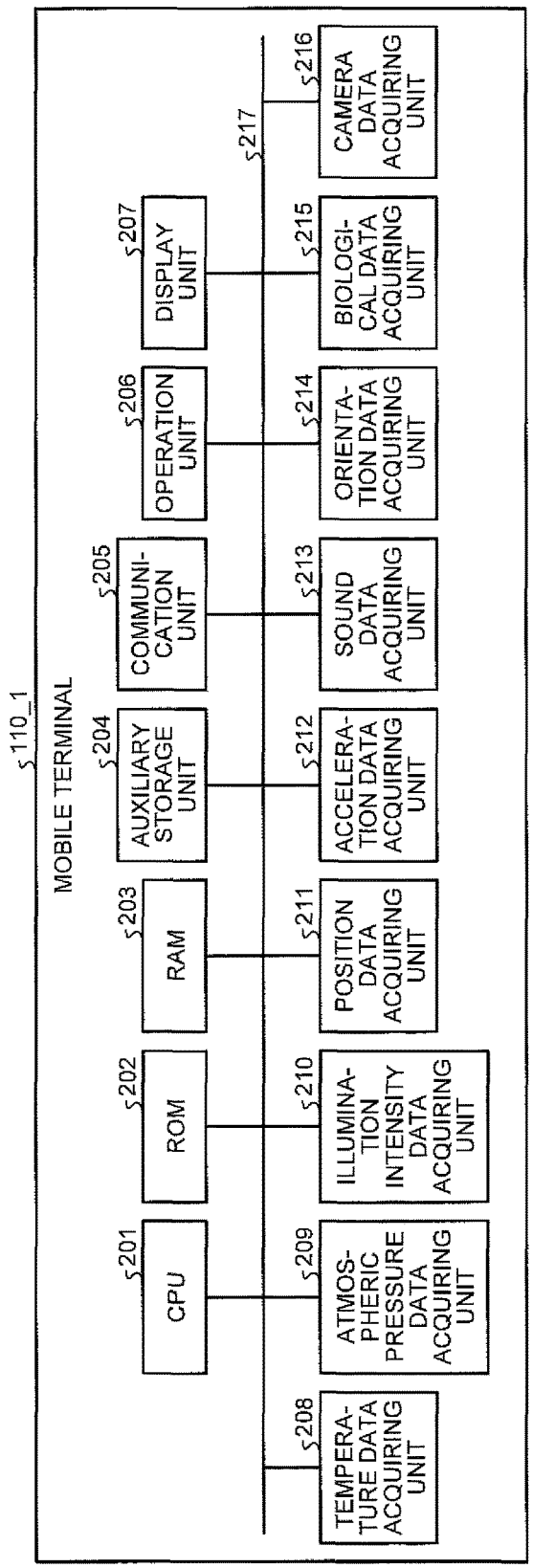
FIG. 2 is a diagram illustrating an exemplary hardware configuration of a mobile terminal.

FIG. 2 is a diagram illustrating an exemplary hardware configuration of the mobile terminal 110_1. As illustrated in FIG. 2, the mobile terminal 110_1 includes a CPU 201, a read only memory (ROM) 202, a random access memory (RAM) 203, an auxiliary storage unit 204, a communication unit 205, an operation unit 206, and a display unit 207. The mobile terminal 110_1 also includes a temperature data acquiring unit 208, an atmospheric pressure data acquiring unit 209, an illumination intensity data acquiring unit 210, a position data acquiring unit 211, an acceleration data acquiring unit 212, and a sound data acquiring unit 213. The mobile terminal 110_1 also includes an orientation data acquiring unit 214, a biological data acquiring unit 215, and a camera data acquiring unit 216. These components of the mobile terminal 110_1 are connected with each other through a bus 217.

The CPU 201 is a computer configured to execute various computer programs installed on the auxiliary storage unit 204. The ROM 202 is a non-transitory memory. The ROM 202 serves as a main storage unit storing therein, for example, various computer programs and data necessary for the CPU 201 to execute the various computer programs stored in the auxiliary storage unit 204. Specifically, the ROM 202 stores therein, for example, boot programs such as a Basic Input/Output System (BIOS) and an Extensible Firmware Interface (EFI).

The RAM 203 is a transitory memory such as a dynamic random access memory (DRAM) or a static random access memory (SRAM), and serves as a main storage unit. The RAM 203 provides a work area onto which the various computer programs stored in the auxiliary storage unit 204 are loaded when executed by the CPU 201.

The auxiliary storage unit 204 stores therein, for example, various computer programs installed on the mobile terminal 110_1, and data used to execute the various computer programs.

The communication unit 205 connects with the server device 120 to receive the request information from the server device 120 and transmit the target data, the position data, and the time data to the server device 120.

The operation unit 206 receives inputs of various instructions to the mobile terminal 110_1 by the user. The display unit 207 displays various screens.

The temperature data acquiring unit 208 includes a built-in temperature sensor to acquire temperature data measured by the temperature sensor (atmospheric temperature data when an atmospheric temperature is measured). The atmospheric pressure data acquiring unit 209 includes a built-in atmospheric pressure sensor to acquire atmospheric pressure data measured by the atmospheric pressure sensor.

The illumination intensity data acquiring unit 210 includes a built-in illumination intensity sensor to acquire illumination intensity data measured by the illumination intensity sensor. The position data acquiring unit 211 includes a built-in GPS sensor to acquire, as position data, latitude-data, longitude data, and altitude data detected by the GPS sensor.

The acceleration data acquiring unit 212 includes a built-in three-axis acceleration sensor to acquire acceleration data in three axis directions measured by the three-axis acceleration sensor. The sound data acquiring unit 213 includes a built-in sound sensor to acquire sound data measured by the sound sensor.

The orientation data acquiring unit 214 includes a built-in geomagnetism sensor to acquire orientation data measured by the geomagnetism sensor. The biological data acquiring unit 215 includes various built-in biological sensors, such as a pulse wave sensor and a blood pressure sensor, to acquire biological data measured by each biological sensor.

The camera data acquiring unit 216 includes a built-in image pickup sensor to acquire, as camera data, still image or moving image data captured by the image pickup sensor.

An acquiring unit included in the mobile terminal 110_1 is not limited the acquiring units illustrated in FIG. 2. The mobile terminal 110_1 may include an acquiring unit for other measurement data. Each acquiring unit includes a built-in measurement sensor in the above description, but the measurement sensor may be externally provided. In other words, the acquiring unit may be configured to acquire, through a wireless or wired communication medium, measurement data obtained by an externally provided measurement sensor.

3. Hardware Configuration of Server Device

Figure 3:
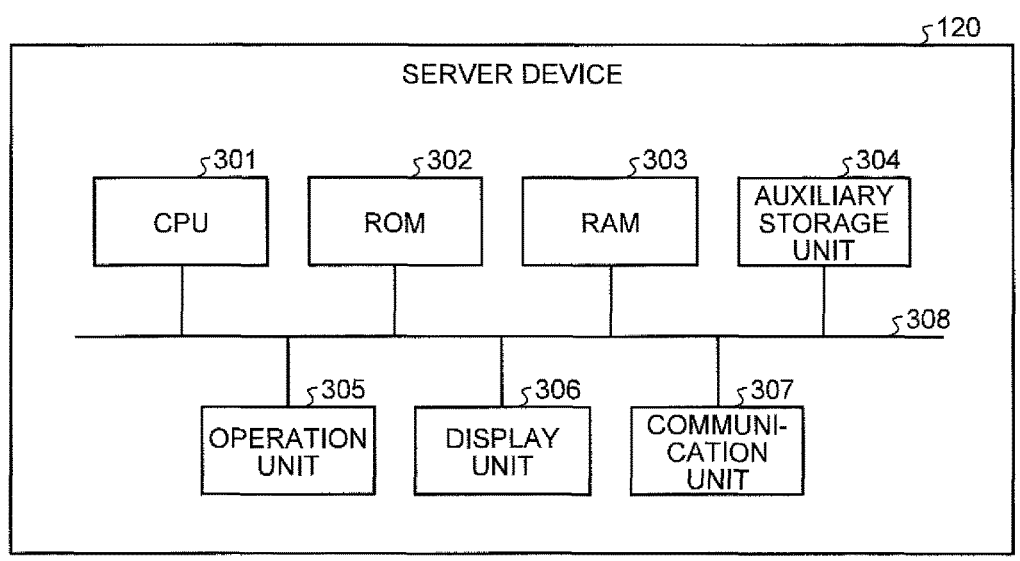
FIG. 3 is a diagram illustrating an exemplary hardware configuration of a server device.

The following describes a hardware configuration of the server device 120. FIG. 3 is a diagram illustrating an exemplary hardware configuration of the server device.

As illustrated in FIG. 3, the server device 120 includes a CPU 301, a ROM 302, a RAM 303, an auxiliary storage unit 304, an operation unit 305, a display unit 306, and a communication unit 307. These components of the server device 120 are connected with each other through a bus 308.

The CPU 301 is a computer configured to execute various computer programs (the data collecting program, the data analyzing program) installed on the auxiliary storage unit 304. The ROM 302 is a non-transitory memory. The ROM 302 serves as a main storage unit storing therein various computer programs and data necessary for the CPU 301 to execute the various computer programs stored in the auxiliary storage unit 304. Specifically, the ROM 302 stores therein boot programs such as a BIOS and an EFI.

The RAM 303 is a transitory memory such as a DRAM or an SRAM and serves as a main storage unit. The RAM 303 provides a work area onto which the various computer programs stored in the auxiliary storage unit 304 are loaded when executed by the CPU 301.

The auxiliary storage unit 304 stores therein, for example, various computer programs installed on the server device 120, data (measurement data) used to execute the various computer programs.

The operation unit 305 receives inputs of various instructions to the server device 120 by the analyst. The display unit 306 displays thereon internal information of the server device 120. The communication unit 307 connects with the mobile terminals 110_1 to 110_n to transmit the request information to the mobile terminals 110_1 to 110_n and receive the target data, the position data, and the time data from the mobile terminals 110_1 to 110_n.

4. Functional Configuration of Mobile Terminal

The following describes a functional configuration of each of the mobile terminals 110_1 to 110_n. In the present embodiment, the mobile terminals 110_1 to 110_n all have the same functional configuration. In the following, the functional configuration of the mobile terminal 110_1 will be described.

Figure 4:
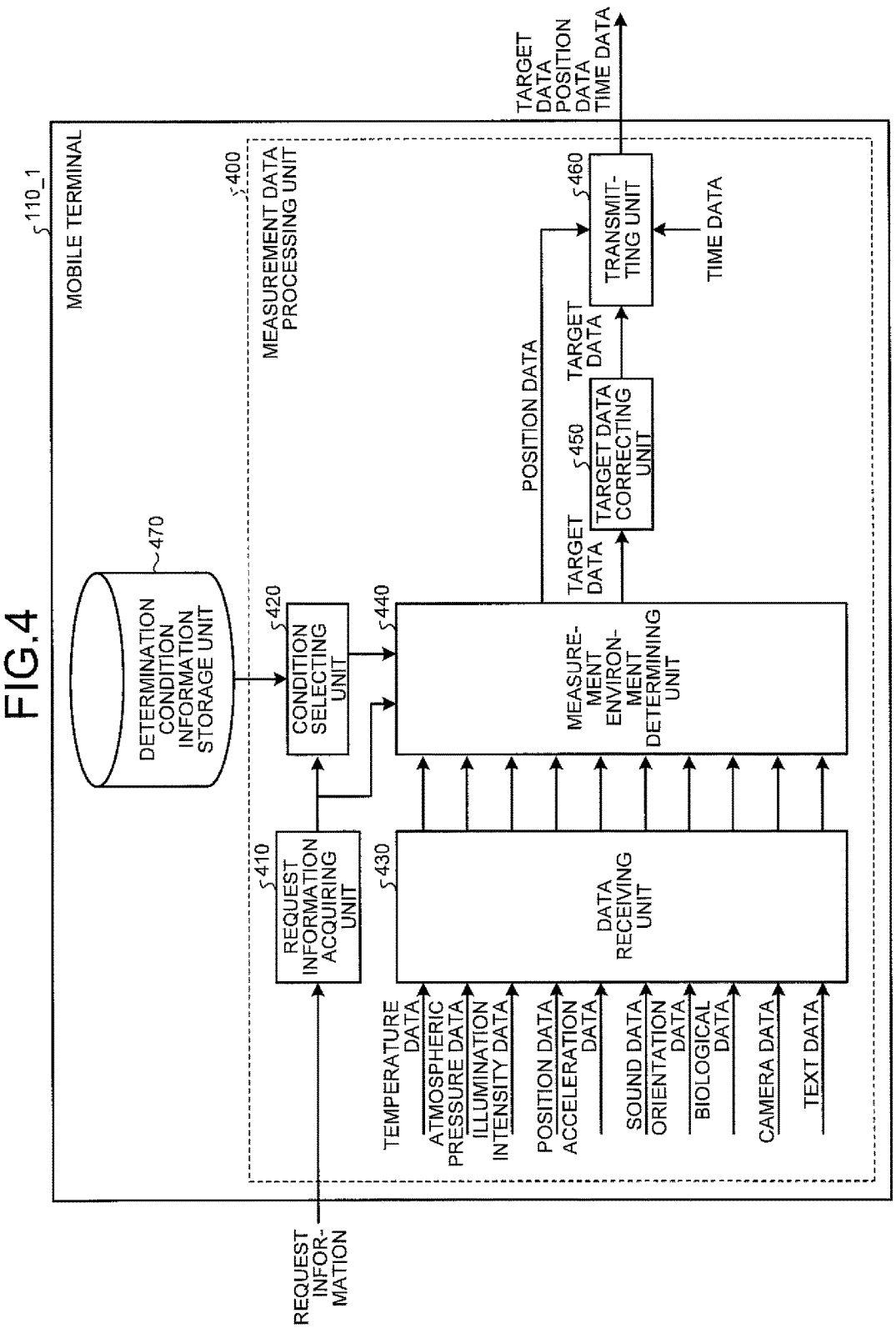
FIG. 4 is a diagram illustrating an exemplary functional configuration of the mobile terminal.

FIG. 4 is a diagram illustrating an exemplary functional configuration of the mobile terminal 110_1. A measurement data processing program is installed on the mobile terminal 110_1 and executed by the mobile terminal 110_1 to serve as a measurement data processing unit 400.

As illustrated in FIG. 4, the measurement data processing unit 400 includes a request information acquiring unit 410, a condition selecting unit 420, a data receiving unit 430, a measurement environment determining unit 440, a target data correcting unit 450, and a transmitting unit 460.

The request information acquiring unit 410 acquires the request information transmitted from the server device 120 and identifies the type of target data requested by the request information (target data in accordance with an analysis purpose). The request information acquiring unit 410 notifies the condition selecting unit 420 and the measurement environment determining unit 440 of the identified type of the target data.

Having received the type of the target data, the condition selecting unit 420 reads, from a determination condition information storage unit 470, determination condition information defining measurement environment inappropriate for measurement of target data of this type and defining a condition for determining that measurement environment is inappropriate. Then, the condition selecting unit 420 notifies the measurement environment determining unit 440 of the read determination condition information.

The data receiving unit 430 receives inputs of pieces of measurement data acquired, for example, at the acquiring units. In the present embodiment, the data receiving unit 430 receives inputs of temperature data, atmospheric pressure data, illumination intensity data, position data, acceleration data, sound data, orientation data, biological data, camera data, and text data. The text data is acquired upon character input through the operation unit 206.

The measurement environment determining unit 440 determines whether measurement data the input of which is received at the data receiving unit 430 matches a condition indicated by the determination condition information notified by the condition selecting unit 420. If the measurement data matches the condition indicated by the determination condition information, the measurement environment determining unit 440 determines that the measurement environment of the mobile terminal 110_1 when the target data was measured is inappropriate.

In this case, even when measurement data the input of which is received by the data receiving unit 430 includes target data of the type notified by the request information acquiring unit 410, the measurement environment determining unit 440 does not notify the target data correcting unit 450 of this measurement data.

If the measurement data does not match the condition indicated by the determination condition information, the measurement environment determining unit 440 determines that measurement environment when target data was measured is appropriate.

In this case, the measurement environment determining unit 440 extracts target data of the type notified by the request information acquiring unit 410 from measurement data the input of which is received by the data receiving unit 430, and notifies the target data correcting unit 450 of the extracted target data. In addition, the measurement environment determining unit 440 notifies the transmitting unit 460 of position data the input of which is received by the data receiving unit 430.

Having received the notification of the target data from the measurement environment determining unit 440, the target data correcting unit 450 corrects the target data in accordance with the type of the target data. Specifically, the correction removes, from the target data, noise (instrument noise) unique to a measurement sensor used to measure the target data. The target data correcting unit 450 notifies the transmitting unit 460 of the target data from which the instrument noise has been removed.

The transmitting unit 460 acquires current time data and transmits, to the server device 120, the current time data together with the target data notified by the target data correcting unit 450 and the position data notified by the measurement environment determining unit 440.

5. Description of Determination Condition Information

Figure 5:
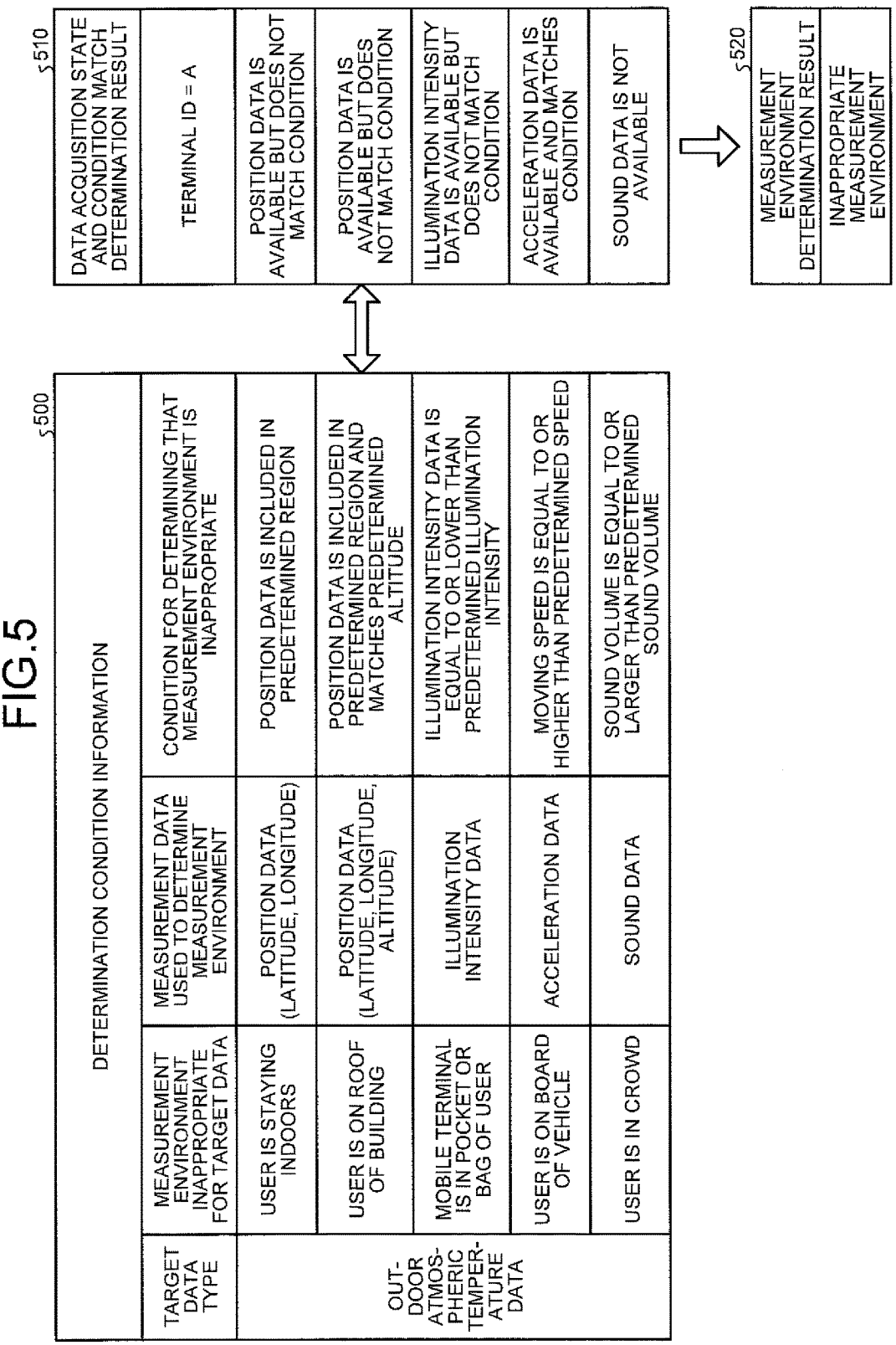
FIG. 5 is a diagram illustrating exemplary determination condition information.

The following describes the determination condition information stored in the determination condition information storage unit 470. FIG. 5 is a diagram illustrating exemplary determination condition information. FIG. 5 illustrates exemplary determination condition information 500 read by the condition selecting unit 420 when the type of target data requested by the request information is "Outdoor Atmospheric Temperature Data".

As illustrated in FIG. 5, the determination condition information 500 includes, as information items, "Target Data Type", "Measurement Environment Inappropriate For Target Data", "Measurement Data Used To Determine Measurement Environment", and "Condition For Determining That Measurement Environment Is Inappropriate".

The item "Target Data Type" stores therein information corresponding to the type of target data requested by the request information transmitted from the server device 120. The example in FIG. 5 illustrates that the determination condition information 500 is determination condition information read when "Outdoor Atmospheric Temperature Data" is requested as the request information.

The item "Measurement Environment Inappropriate For Target Data" stores therein information on measurement environment inappropriate for measuring target data of the type requested by the request information. In the example in FIG. 5, information on measurement environment inappropriate for measuring outdoor atmospheric temperature data is stored because the type of target data requested by the request information is "Outdoor Atmospheric Temperature Data". Specifically, the stored information includes "the user is staying indoors", "the user is on the roof of a building", "the mobile terminal is in a pocket or a bag of the user", "the user is on board of a vehicle", and "the user is in a crowd". When the user is staying indoors or in a vehicle (for example, a vehicle equipped with an air-conditioning machine), temperature data measured by the built-in temperature sensor included in the mobile terminal 110_1 is unlikely to appropriately indicate outdoor atmospheric temperature data. When the user is on the roof of a building or in a crowd, temperature data measured by the built-in temperature sensor included in the mobile terminal 110_1 includes error. Similarly, when the mobile terminal is in a pocket or a bag, temperature data measured by the built-in temperature sensor included in the mobile terminal 110_1 is affected by the body temperature of the user.

In this manner, "Measurement Environment Inappropriate For Target Data" stores therein information on inappropriate measurement environment when the built-in measurement sensor included in the mobile terminal 110_1 obtains measurement data.

The item "Measurement Data Used To Determine Measurement Environment" stores therein the type of measurement data used to determine whether measurement environment matches "Measurement Environment Inappropriate For Target Data".

Specifically, the determination of whether the user is staying indoors is performed based on position data detected by the built-in GPS sensor included in the mobile terminal 110_1. Similarly, the determination of whether the user is on the roof of a building is performed based on position data detected by the built-in GPS sensor included in the mobile terminal 110_1.

The determination of whether the mobile terminal is in a pocket or a bag of the user is perform based on illumination intensity data measured by the built-in illumination intensity sensor included in the mobile terminal 110_1.

The determination of whether the user is in a vehicle is performed based on acceleration data measured by the built-in acceleration sensor included in the mobile terminal 110_1. The determination of whether the user is in a crowd is performed based on sound data measured by the built-in sound sensor included in the mobile terminal 110_1.

The item "Condition For Determining That Measurement Environment Is Inappropriate" defines a condition for the measurement environment determining unit 440 to determine that measurement environment is inappropriate based on "Measurement Data Used To Determine Measurement Environment".

Specifically, the determination of whether the user is staying indoors is performed based on whether the position data is included in a predetermined region. If it is determined that the position data is included in the predetermined region, the measurement environment determining unit 440 determines that the user is staying indoors. If it is determined the position data is not included in the predetermined region, the measurement environment determining unit 440 determines that the user is staying outdoors.

The determination of whether the user is on the roof of a building is performed based on whether the position data (the latitude data and the longitude data) is included in a predetermined region and whether the position data (altitude data) matches a predetermined altitude. If it is determined that the position data is not included in the predetermined region or if it is determined that the position data does not match the predetermined altitude, the measurement environment determining unit 440 determines that the user is not on the roof of a building. If it is determined that the position data is included in the predetermined region and matches the predetermined altitude, the measurement environment determining unit 440 determines that the user is on the roof of a building.

The determination of whether the mobile terminal 110_1 is in a pocket or a bag of the user is performed based on whether the illumination intensity data is equal to or lower than a predetermined illumination intensity. If it is determined that the illumination intensity data is equal to or lower than the predetermined illumination intensity, the measurement environment determining unit 440 determines that the mobile terminal is in a pocket or a bag of the user. If it is determined that the illumination intensity data is higher than the predetermined illumination intensity, the measurement environment determining unit 440 determines that the mobile terminal 110_1 is not in a pocket or a bag of the user.

The determination of whether the user is in a vehicle is performed based on whether the moving speed of the user calculated based on the acceleration data is equal to or higher than a predetermined speed. If it is determined that the moving speed of the user is equal to or higher than the predetermined speed, the measurement environment determining unit 440 determines that the user is in a vehicle. If it is determined that the moving speed of the user is lower than the predetermined speed, the measurement environment determining unit 440 determines that the user is not in a vehicle.

The determination of whether the user is in a crowd is performed based on whether a sound volume around the user calculated based on the sound data is equal to or larger than a predetermined sound volume. If it is determined that the sound volume is equal to or larger than the predetermined sound volume, the measurement environment determining unit 440 determines that the user is in a crowd. If it is determined that the sound volume is smaller than the predetermined sound volume, the measurement environment determining unit 440 determines that the user is not in a crowd.

In this manner, the determination condition information 500 can be used to perform the determination of whether target data of a type requested by the request information is measured under appropriate measurement environment, based on measurement data other than this target data.

Data acquisition state and condition match determination result 510 illustrated on a right side in FIG. 5 illustrates that the mobile terminal 110_1 with the terminal ID "A" determines, based on the determination condition information 500, whether temperature data is measured under measurement environment appropriate for acquiring outdoor atmospheric temperature data.

According to the data acquisition state and condition match determination result 510, the mobile terminal 110_1 determines that the acquired position data is not included in the predetermined region (does not match the condition).

According to the data acquisition state and condition match determination result 510, the mobile terminal 110_1 determines that the acquired position data is not included in the predetermined region or does not match the predetermined altitude (does not match the condition).

According to the data acquisition state and condition match determination result 510, the mobile terminal 110_1 determines that the acquired illumination intensity data is higher than the predetermined illumination intensity (does not match the condition).

According to the data acquisition state and condition match determination result 510, the mobile terminal 110_1 determines that the acquired moving speed of user calculated based on acceleration data is equal to or higher than the predetermined speed (matches the condition).

According to the data acquisition state and condition match determination result 510, the mobile terminal 110_1 does not perform the determination of whether the calculated sound volume is equal to or larger than the predetermined sound volume because the sound data could not be acquired.

If measurement data other than the target data matches any one of conditions stored as "Condition For Determining That Measurement Environment Is Inappropriate", the measurement environment determining unit 440 determines that the target data is measured under inappropriate measurement environment. According to the data acquisition state and condition match determination result 510, the moving speed of the user calculated based on the acceleration data matches one of the conditions.

Accordingly, the measurement environment determining unit 440 determines that atmospheric temperature data is measured under inappropriate measurement environment (refer to a measurement environment determination result 520).

6. Process of Measurement Data Collecting Processing

The following describes the process of measurement data collecting processing executed by the measurement data processing unit 400 of the mobile terminal 110_1.

Figure 6:
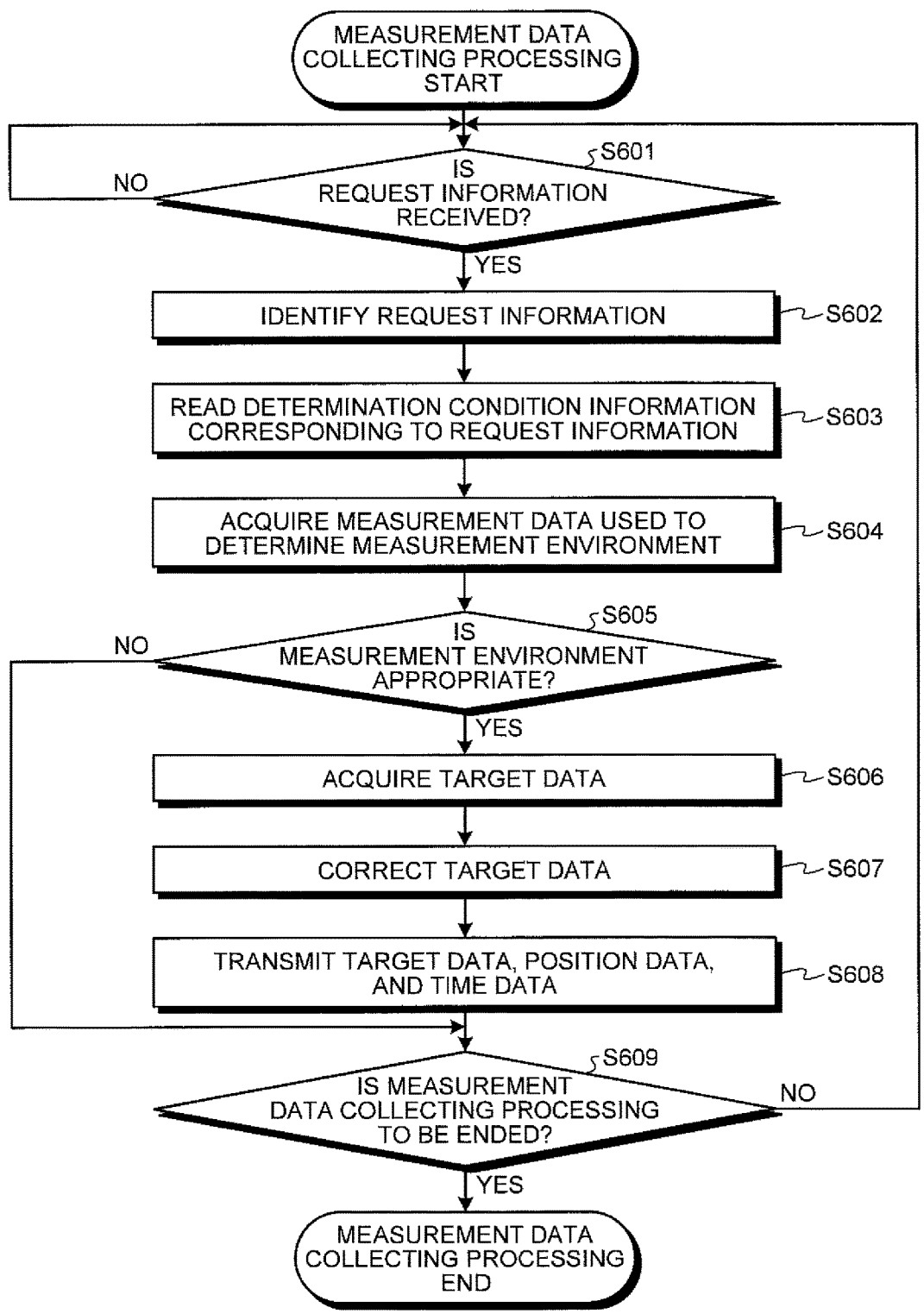
FIG. 6 is a flowchart of measurement data collecting processing.

FIG. 6 is a flowchart of the measurement data collecting processing executed by the measurement data processing unit 400.

At step S601, the request information acquiring unit 410 determines whether the request information is received from the server device 120. At step S601, if it is determined that the request information is not received, the process stands-by for reception of the request information.

At step S601, if it is determined that the request information is received, the process proceeds to step S602. At step S602, the request information acquiring unit 410 identifies the type of target data requested by the received request information, and notifies the condition selecting unit 420 and the measurement environment determining unit 440 of the identified type of the target data.

At step S603, the condition selecting unit 420 reads, from the determination condition information storage unit 470, the determination condition information 500 corresponding to the type of the target data notified by the request information acquiring unit 410, and notifies the measurement environment determining unit 440 of the determination condition information 500.

At step S604, the measurement environment determining unit 440 acquires measurement data used to determine measurement environment from among measurement data received by the data receiving unit 430. The measurement environment determining unit 440 acquires the measurement data used to determine measurement environment based on the determination condition information 500.

At step S605, the measurement environment determining unit 440 determines whether the measurement data acquired at step S604 matches a condition for determination of inappropriate measurement environment (whether the measurement environment is appropriate). At step S605, if it is determined that the measurement environment is inappropriate (matches the condition), the process proceeds to step S609. In this case, the acquired target data is not transmitted to the server device 120.

At step S605, if it is determined that the measurement environment is appropriate (does not match the condition), the process proceeds to step S606. At step S606, the measurement environment determining unit 440 extracts target data of the type notified by the request information acquiring unit 410 from the data receiving unit 430, and notifies the target data correcting unit 450 of the extracted target data. The measurement environment determining unit 440 also extracts position data from the data receiving unit 430 and notifies the transmitting unit 460 of the extracted position data.

At step S607, the target data correcting unit 450 corrects the target data notified by the measurement environment determining unit 440. In addition, the target data correcting unit 450 notifies the transmitting unit 460 of the corrected target data.

At step S608, the transmitting unit 460 transmits the target data, the position data, and the time data indicating the current time to the server device 120.

At step S609, the request information acquiring unit 410 determines whether to end the measurement data collecting processing. If it is determined that the measurement data collecting processing is not to be ended, the process returns to step S601. If it is determined that the measurement data collecting processing is to be ended, the measurement data collecting processing is ended.

7. Summary

As described above, the measurement data collecting system in the present embodiment is configured as follows: when transmitting target data of a type requested by the request information from the mobile terminal to the server device, the mobile terminal determines measurement environment when this target data is measured; the target data is not transmitted to the server device if it is determined that the target data is measured under inappropriate measurement environment, but is transmitted to the server device if it is determined that the measurement environment is appropriate; and the determination of whether the measurement environment is appropriate is performed based on the determination condition information using measurement data other than the target data of the type requested by the request information.

This allows the server device to collect target data requested by the request information and measured under appropriate measurement environment in accordance with an analysis purpose.

Second Embodiment

In the first embodiment, each mobile terminal having received request information determines whether acquired target data is measured under appropriate measurement environment, and transmits, to the server device, only target data determined to have been measured under appropriate measurement environment.

In a second embodiment, however, each mobile terminal transmits all acquirable measurement data to the server device. Then, the server device determines whether target data is measured under appropriate measurement environment. In the present embodiment, the determination of measurement environment is performed based on measurement data obtained at other mobile terminals as well. The following mainly describes any difference between the first and the second embodiments.

1. Measurement Data Collecting System

Figure 7:
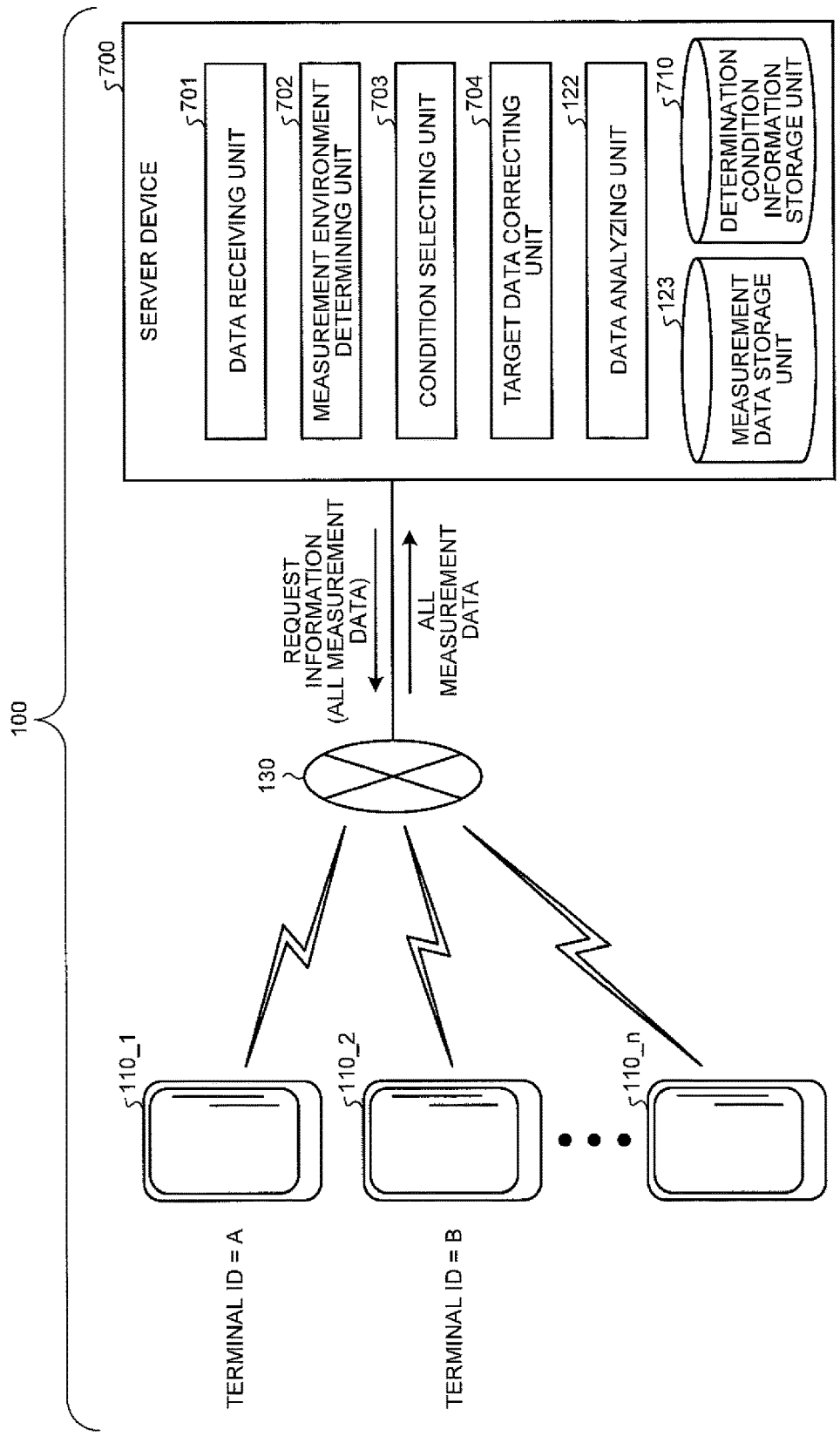
FIG. 7 is a diagram illustrating an exemplary entire configuration of the measurement data collecting system.

First, the entire configuration of the measurement data collecting system 100 in the second embodiment will be described. FIG. 7 is a diagram illustrating an exemplary entire configuration of the measurement data collecting system 100 in the second embodiment.

As illustrated in FIG. 7, the measurement data collecting system 100 includes the same devices included in the measurement data collecting system 100 of the first embodiment described with reference to FIG. 1. FIG. 7 differs from FIG. 1 with regard to the content of request information transmitted from a server device 700 to each of the mobile terminals 110_1 to 110_n, measurement data transmitted from the mobile terminals 110_1 to 110_n to the server device 120, and functions of the server device 700.

As illustrated in FIG. 7, the server device 700 in the second embodiment requests the mobile terminals 110_1 to 110_n to transmit all measurement data acquirable by the mobile terminals 110_1 to 110_n. The mobile terminals 110_1 to 110_n transmit all measurement data acquirable by the mobile terminals 110_1 to 110_n to the server device 700.

As illustrated in FIG. 7, the server device 700 includes a data receiving unit 701, a measurement environment determining unit 702, a condition selecting unit 703, a target data correcting unit 704, and the data analyzing unit 122. The server device 700 also includes a determination condition information storage unit 710 in addition to the measurement data storage unit 123. The functions of these components of the server device 700 will be described below in detail.

2. Functional Configuration of Server Device

Figure 8:
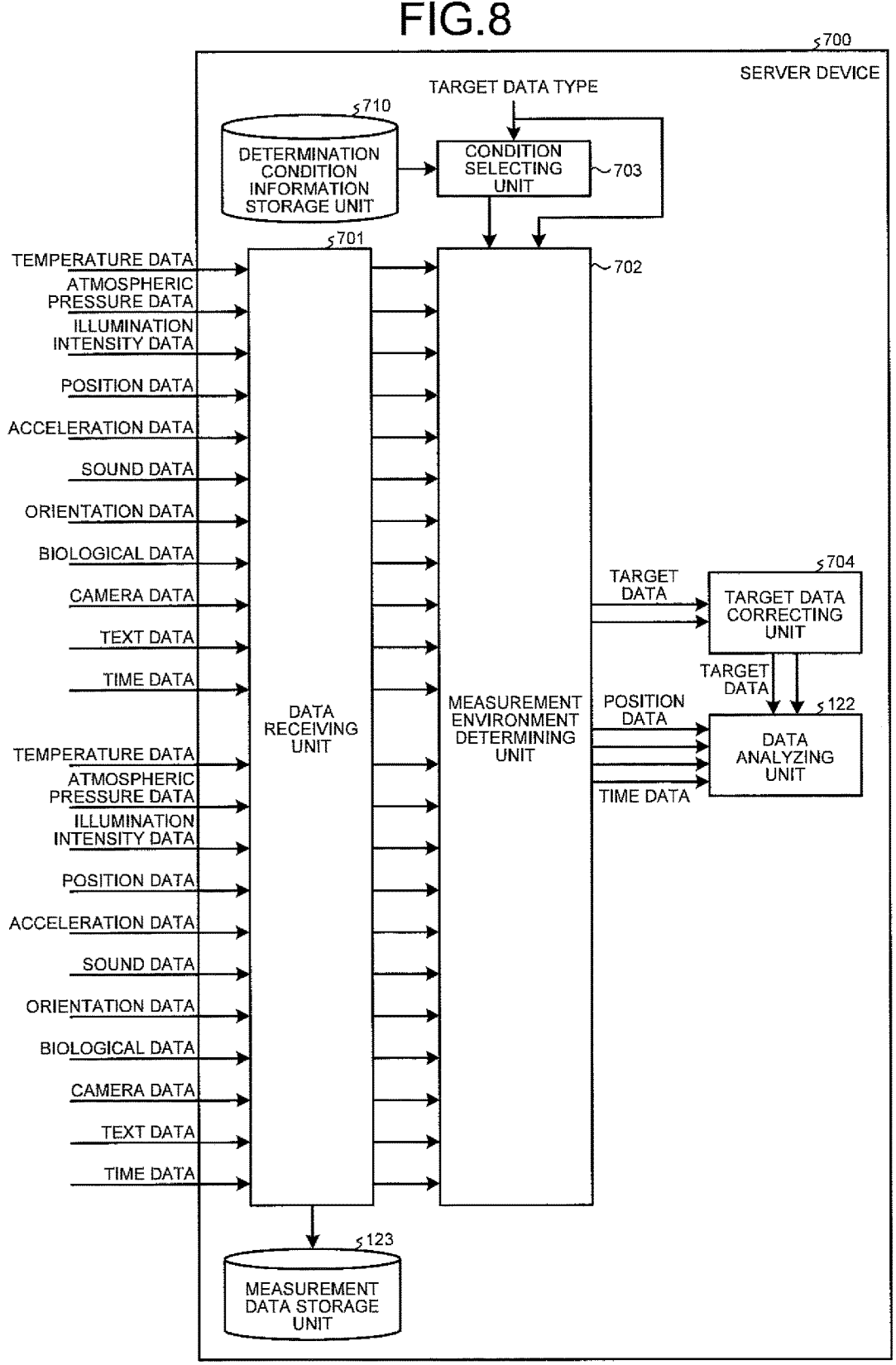
FIG. 8 is a diagram illustrating an exemplary functional configuration of the server device.

FIG. 8 is a diagram illustrating an exemplary functional configuration of the server device 700. In FIG. 8, when the type of measurement data (target data) in accordance with an analysis purpose is specified by the analyst, the condition selecting unit 703 receives the type of the target data. In addition, the condition selecting unit 703 reads, from the determination condition information storage unit 710, determination condition information that defines measurement environment inappropriate for measuring target data of the specified type and a condition for determination of inappropriate measurement environment, and notifies the measurement environment determining unit 702 of the determination condition information.

The data receiving unit 701 receives an input of all measurement data acquirable by the mobile terminals 110_1 to 110_n. In the present embodiment, the data receiving unit 701 receives inputs of temperature data, atmospheric pressure data, illumination intensity data, position data, acceleration data, and sound data that are acquirable by each of the mobile terminals 110_1 to 110_n. The data receiving unit 701 also receives inputs of orientation data, biological data, camera data, text data, and time data. For the purpose of illustration, FIG. 8 illustrates that the data receiving unit 701 receives inputs of all measurement data acquirable by the mobile terminals 110_1 and 110_2. A user possessing the mobile terminal 110_1 and a user possessing the mobile terminal 110_2 are positioned close to each other (in a predetermined range).

The measurement environment determining unit 702 determines whether measurement data the input of which is received by the data receiving unit 701 matches a condition indicated by the determination condition information notified by the condition selecting unit 703.

Before determining whether the condition is matched, the measurement environment determining unit 702 determines whether the users possessing the mobile terminals are positioned close to each other based on position data the input of which is received by the data receiving unit 701. The measurement environment determining unit 702 also performs grouping of the measurement data transmitted from each of the mobile terminals possessed by the users determined to be positioned close to each other.

In the present embodiment, the measurement environment determining unit 702 determines whether each measurement data determined to belong to the same group by the grouping matches the condition indicated by the determination condition information. In this example, the measurement data transmitted from the mobile terminal 110_1 and the measurement data transmitted from the mobile terminal 110_2 are determined to belong to the same group.

Specifically, the measurement environment determining unit 702 performs the determination of measurement environment on the target data transmitted from the mobile terminal 110_1 based on measurement data other than the target data transmitted from the mobile terminal 110_1, and the measurement data transmitted from the mobile terminal 110_2.

Similarly, the measurement environment determining unit 702 performs the determination of measurement environment on the target data transmitted from the mobile terminal 110_2 based on measurement data other than the target data transmitted from the mobile terminal 110_2, and the measurement data transmitted from the mobile terminal 110_1.

As a result of the determination, if the condition indicated by the determination condition information matches, the measurement environment determining unit 702 determines that the target data is measured by the mobile terminal 110_1 or 110_2 under inappropriate measurement environment.

In this case, even when target data of the specified type is included in the measurement data the input of which is received by the data receiving unit 701, the measurement environment determining unit 702 does not notify the target data correcting unit 704 of this measurement data.

If the condition indicated by the determination condition information does not match, the measurement environment determining unit 702 determines that the target data is measured by the mobile terminal 110_1, 110_2 under appropriate measurement environment.

In this case, the measurement environment determining unit 702 extracts target data of the specified type from the measurement data the input of which is received by the data receiving unit 701, and notifies the target data correcting unit 704 of the target data. The measurement environment determining unit 702 also notifies the data analyzing unit 122 of the position data and the time data the inputs of which are received by the data receiving unit 701.

Having received the notification of the target data from the measurement environment determining unit 702, the target data correcting unit 704 corrects the target data in accordance with the type of the target data. Specifically, the correction removes, from this target data, noise (instrument noise) unique to a measurement sensor used to measure the target data. The target data correcting unit 704 notifies the data analyzing unit 122 of the target data from which the instrument noise has been removed.

The data analyzing unit 122 has the same function of the data analyzing unit 122 in the first embodiment described with reference to FIG. 1, and thus description of the function is omitted.

3. Description of Determination Condition Information

Figure 9:
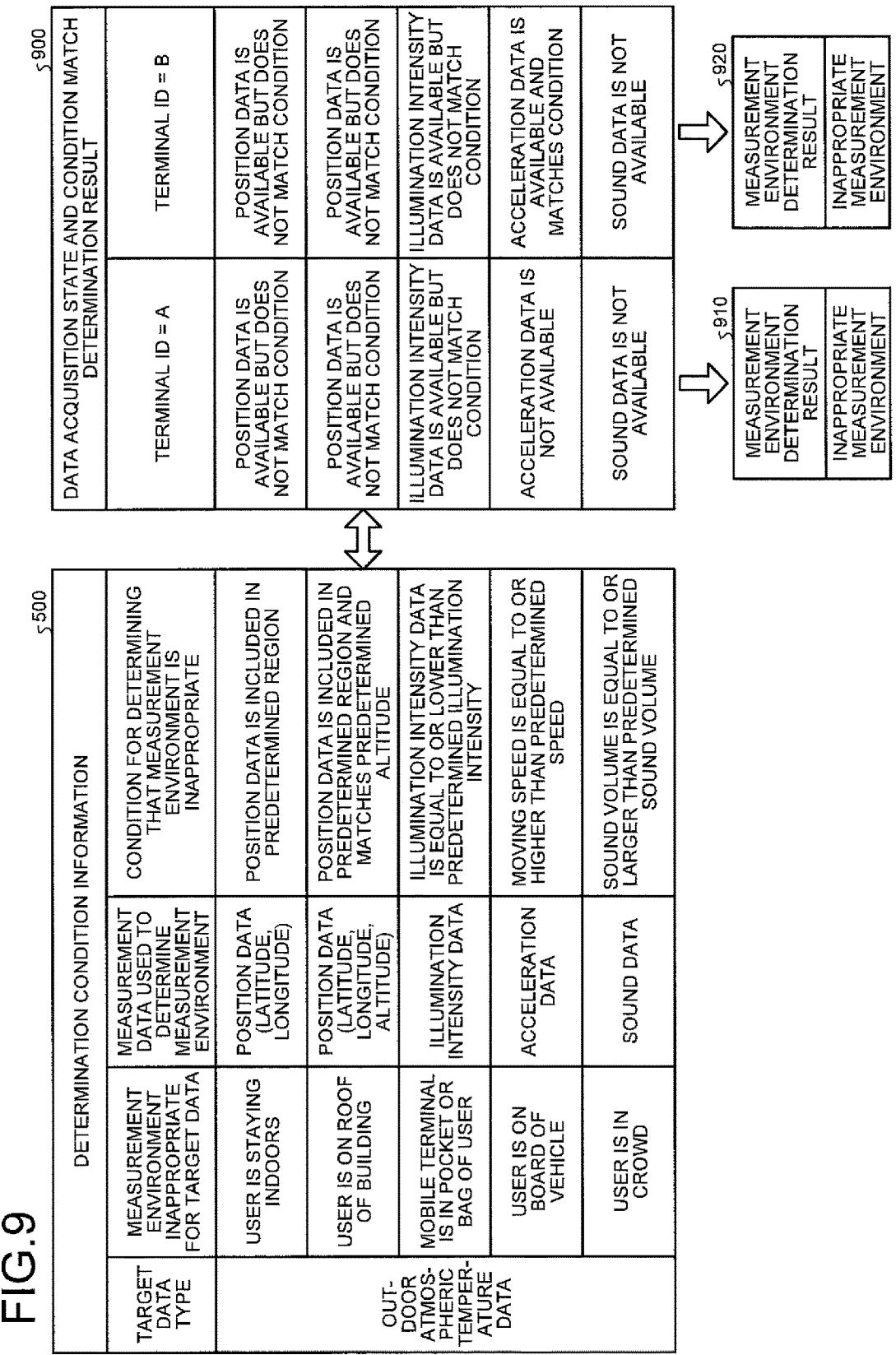
FIG. 9 is a diagram illustrating exemplary determination condition information.

The following describes the determination condition information stored in the determination condition information storage unit 710. FIG. 9 is a diagram illustrating exemplary determination condition information. The determination condition information 500 illustrated in FIG. 9 is the same as the determination condition information 500 illustrated in FIG. 5. Data acquisition state and condition match determination result 900 illustrated on a right side in FIG. 9 is different from the data acquisition state and condition match determination result 510 illustrated on the right side in FIG. 5. Thus, the following mainly describes the data acquisition state and condition match determination result 900.

As described above, the measurement data transmitted from the mobile terminal 110_1 specified by the terminal ID "A" and the measurement data transmitted from the mobile terminal 110_2 specified by the terminal ID "B" belong to the same group. Thus, the measurement environment determining unit 702 uses both of the measurement data transmitted from the mobile terminal 110_1 and the measurement data transmitted from the mobile terminal 110_2 to determine whether measurement environment is appropriate based on the determination condition information 500.

According to the data acquisition state and condition match determination result 900, the measurement environment determining unit 702 determines that the position data transmitted from the mobile terminal 110_1 is not included in the predetermined region (does not match the condition). Similarly, the measurement environment determining unit 702 determines that the position data transmitted from the mobile terminal 110_2 is not included in the predetermined region (does not match the condition).

According to the data acquisition state and condition match determination result 900, the measurement environment determining unit 702 determines that the position data transmitted from the mobile terminal 110_1 is not included in the predetermined region or does not match the predetermined altitude (does not match the condition). Similarly, the measurement environment determining unit 702 determines that the position data transmitted from the mobile terminal 110_2 is not included in the predetermined region or does not match the predetermined altitude (does not match the condition).

According to the data acquisition state and condition match determination result 900, the measurement environment determining unit 702 determines that the illumination intensity data transmitted from the mobile terminal 110_1 is higher than the predetermined illumination intensity (does not match the condition). Similarly, the measurement environment determining unit 702 determines that the illumination intensity data transmitted from the mobile terminal 110_2 is higher than the predetermined illumination intensity.

According to the data acquisition state and condition match determination result 900, the measurement environment determining unit 702 does not perform the determination of whether the calculated moving speed is equal to or higher than the predetermined speed because the acceleration data from the mobile terminal 110_1 could not be acquired. The measurement environment determining unit 702 determines that the moving speed calculated based on the acceleration data transmitted from the mobile terminal 110_2 is equal to or higher than the predetermined speed (matches the condition).

According to the data acquisition state and condition match determination result 900, the measurement environment determining unit 702 does not perform the determination of whether the calculated sound volume is equal to or larger than the predetermined sound volume because the sound data could not be acquired from the mobile terminal 110_1. Similarly, the measurement environment determining unit 702 does not perform the determination of whether the calculated sound volume is equal to or larger than the predetermined sound volume because the sound data could not be acquired from the mobile terminal 110_2.

The measurement environment determining unit 702 determines that the measurement environment is inappropriate if measurement data that is measurement data other than the target data and belongs to the same group matches any one of conditions stored as "Condition For Determining That Measurement Environment Is Inappropriate". According to the data acquisition state and condition match determination result 900, the moving speed of the user calculated based on the acceleration data transmitted from the mobile terminal 110_2 matches one of the conditions.

Accordingly, according to the data acquisition state and condition match determination result 900, the measurement environment determining unit 702 determines that atmospheric temperature data is measured under inappropriate measurement environment (refer to a measurement environment determination result 910). The measurement environment determining unit 702 provides the same determination for a measurement environment determination result 920.

The example in FIG. 9 describes the case in which temperature data is transmitted from both of the mobile terminal 110_1 and the mobile terminal 110_2. The same description is applicable to a case in which temperature data is transmitted only from, for example, the mobile terminal 110_1. In this case, the measurement environment determining unit 702 determines measurement environment of the temperature data transmitted from the mobile terminal 110_1 based on the measurement data transmitted from the mobile terminal 110_2 (for example, the acceleration data).

4. Process of Measurement Data Collecting Processing

Figure 10:
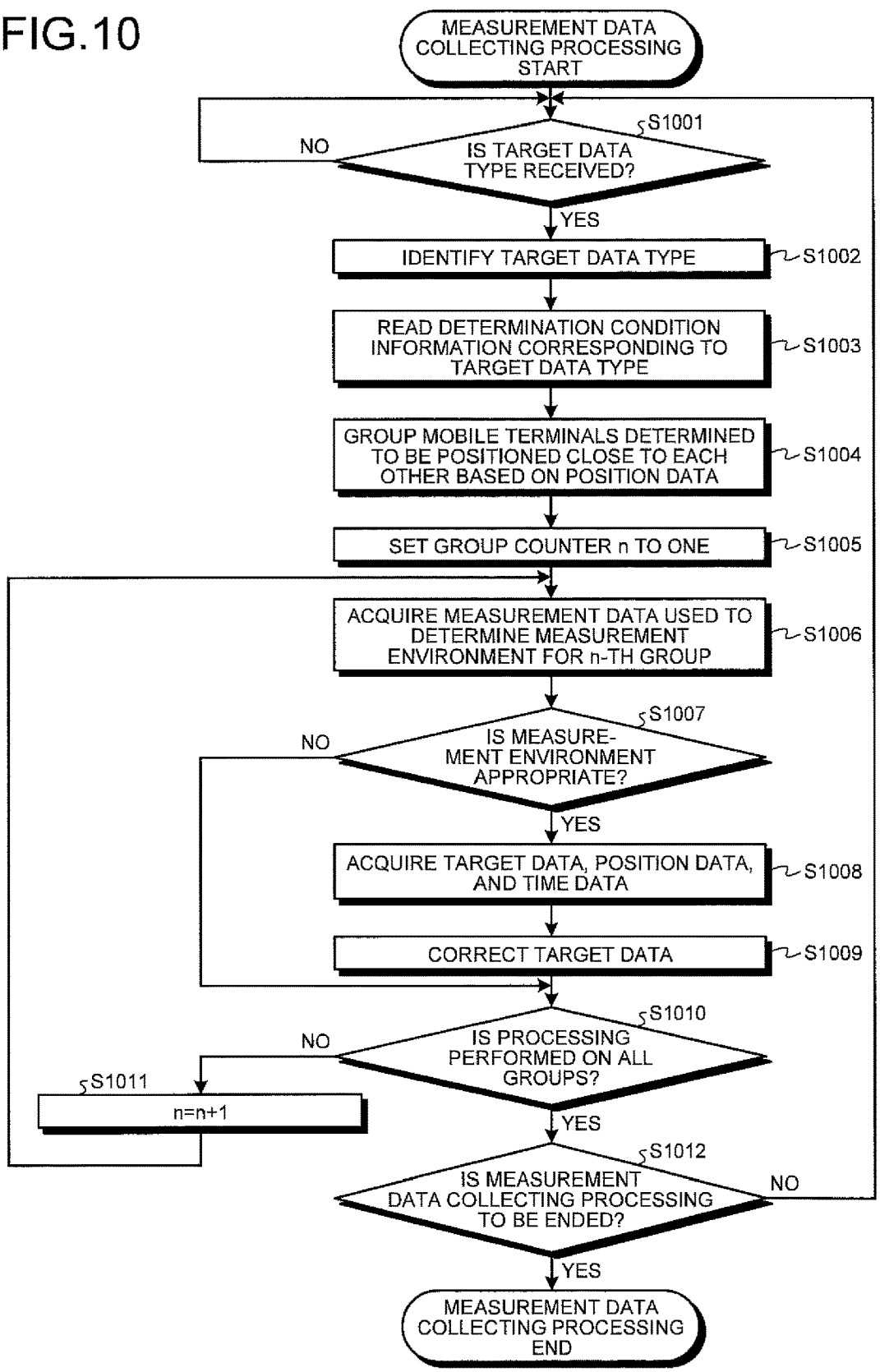
FIG. 10 is a flowchart of the measurement data collecting processing.

The following describes the process of the measurement data collecting processing executed by the server device 120. FIG. 10 is a flowchart of the measurement data collecting processing executed by the server device 120.

At step S1001, the condition selecting unit 703 determines whether specification of the type of target data that is measurement data in accordance with an analysis purpose is received.

At step S1001, if it is determined that the specification of the type of the target data is not received, the process stands-by for reception of the specification. At step S1001, if it is determined that the specification is received, the process proceeds to step S1002.

At step S1002, the condition selecting unit 703 identifies the type of the target data. At step S1003, the condition selecting unit 703 reads the determination condition information 500 corresponding to the identified type of the target data from the determination condition information storage unit 710, and notifies the measurement environment determining unit 702 of the determination condition information 500.

At step S1004, the measurement environment determining unit 702 extracts the position data from the measurement data the input of which is received by the data receiving unit 701. The measurement environment determining unit 702 then determines whether users possessing the mobile terminals are positioned close to each other based on the extracted position data. The measurement environment determining unit 702 then categorizes the mobile terminals possessed by the users positioned close to each other into the same group, and performs grouping of measurement data transmitted from the mobile terminals categorized into the same group.

At step S1005, the measurement environment determining unit 702 substitutes an initial value (=1) into a counter n for counting the number of groups obtained by the grouping.

At step S1006, the measurement environment determining unit 702 acquires measurement data used to determine measurement environment from measurement data belonging to the n-th group among measurement data received by the data receiving unit 701. The measurement environment determining unit 702 performs this acquisition of the measurement data used to determine measurement environment based on the determination condition information 500.

At step S1007, the measurement environment determining unit 702 determines whether the measurement data acquired at step S1006 matches a condition for determination of inappropriate measurement environment (whether the measurement environment is appropriate). At step S1007, if it is determined that the measurement environment is inappropriate (matches the condition), the process proceeds to step S1010. In this case, the data analyzing unit 122 is not notified of the target data the input of which is received by the data receiving unit 701.

At step S1007, if it is determined that the measurement environment is appropriate (does not match the condition), the process proceeds to step S1008. At step S1008, the measurement environment determining unit 702 extracts target data of the specified type from the data receiving unit 701 and notifies the target data correcting unit 704 the extracted target data. The measurement environment determining unit 702 also extracts position data from the data receiving unit 701 and notifies the data analyzing unit 122 of the extracted position data. The measurement environment determining unit 702 also extracts time data from the data receiving unit 701 notifies the data analyzing unit 122 of the extracted time data.

At step S1009, the target data correcting unit 704 corrects the target data notified by the measurement environment determining unit 702. Then, the target data correcting unit 704 notifies the data analyzing unit 122 of the corrected target data.

At step S1010, the measurement environment determining unit 702 determines whether the processing at steps S1006 to S1009 is executed on all groups obtained by the grouping.

At step S1010, if it is determined that the processing is not executed on a group, the process proceeds to step S1011. At step S1011, the group counter n is incremented, and the process returns to step S1006.

At step S1010, if it is determined that the processing is executed on all groups, the process proceeds to step S1012.

At step S1012, the measurement environment determining unit 702 determines whether to end the measurement data collecting processing. If it is determined that the measurement data collecting processing is not to be ended, the process returns to step S1001. At step S1012, if it is determined that the measurement data collecting processing is to be end, the measurement data collecting processing is ended.

5. Summary

As described above, the measurement data collecting system in the present embodiment is configured as follows: all measurement data (including target data in accordance with an analysis purpose) acquired at each mobile terminal is transmitted to the server device; among the target data in accordance with the analysis purpose, the data analyzing unit is not notified of target data determined to be measured under inappropriate measurement environment, but is notified of only target data determined to be measured under appropriate measurement environment; the determination of whether the measurement environment is appropriate is performed based on the determination condition information also using measurement data acquired at any mobile terminal other than the mobile terminal at which the target data is acquired; and the measurement data acquired at another mobile terminal is measurement data acquired at a mobile terminal positioned close to the mobile terminal at which the target data is acquired.

This allows the server device to collect and analyze target data measured under appropriate measurement environment in accordance with an analysis purpose.

Third Embodiment

In the first and the second embodiments, target data acquired at each of a plurality of mobile terminals and measured under appropriate measurement environment is used in analysis by the data analyzing unit 122. However, the target data acquired at each mobile terminal and measured under appropriate measurement environment may be grouped based on a predetermined index, and each group may be provided with averaging processing and then used in the analysis. This achieves reduction of errors in the target data used in the analysis.

The first and the second embodiments describe the exemplary processing at the data analyzing unit 122, which produces an atmospheric temperature map based on atmospheric temperature data. However, the exemplary processing at the data analyzing unit 122 is not limited thereto. For example, the data analyzing unit 122 may produce a street lamp brightness map based on illumination intensity data.

Alternatively, the data analyzing unit 122 may perform analysis on a combination of target data of a plurality of types. For example, atmospheric temperature data and atmospheric pressure data may be combined to produce a weather forecast map. As another example, recognition processing of sound data may be performed on a combination of the sound data and text data input before or after acquisition of the sound data (text data input as a search query) so as to achieve an improved recognition accuracy of sound data.

Fourth Embodiment

In the second and the third embodiments, measurement data acquired at a plurality of mobile terminals is used in the determination of measurement environment when target data is measured. In a fourth embodiment, however, the measurement data acquired at the mobile terminals is used to correct the target data, which will be described below.

1. Configuration of Measurement Data Collecting System

Figure 11:
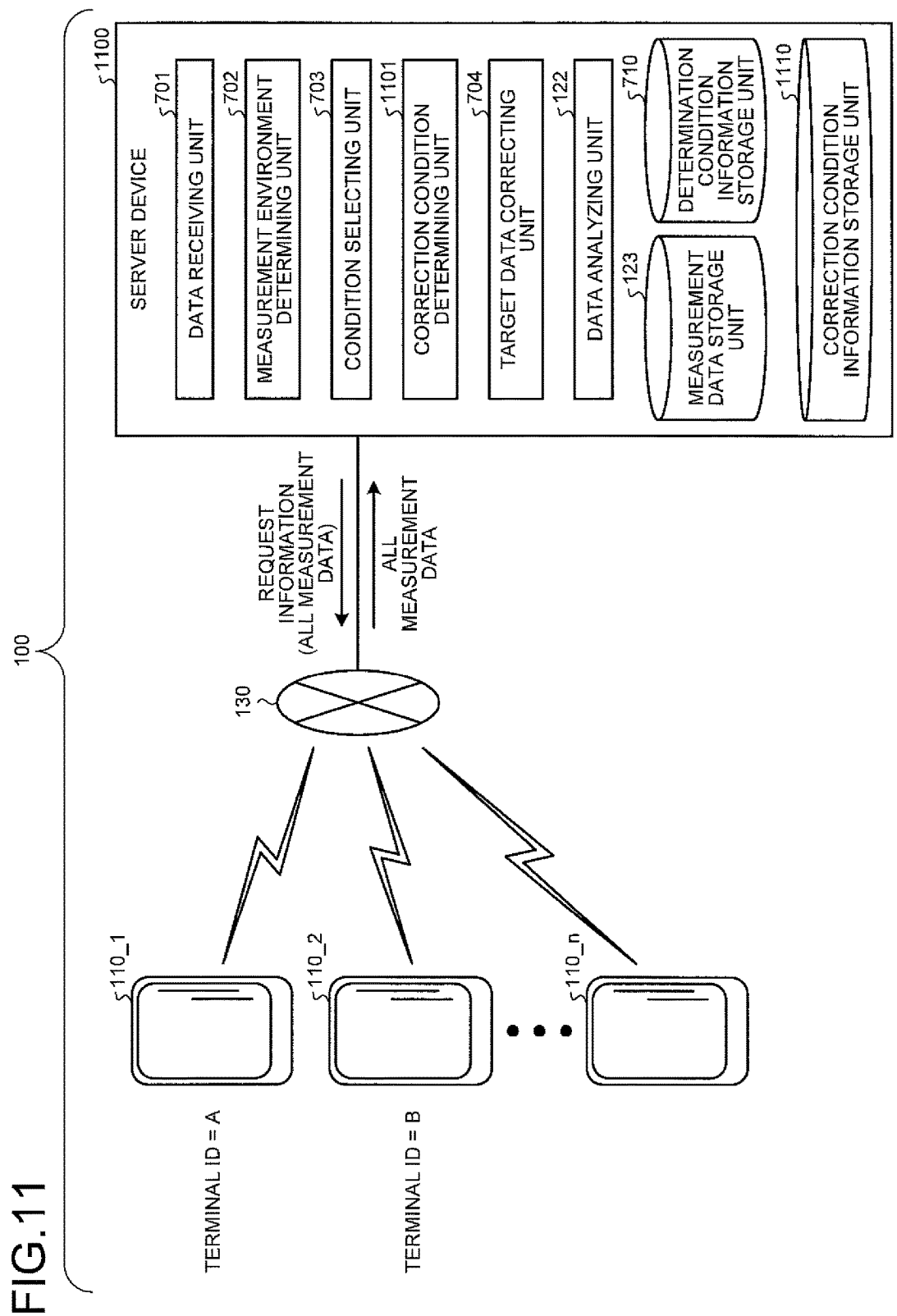
FIG. 11 is a diagram illustrating an exemplary entire configuration of the measurement data collecting system.

The following first describes the entire configuration of the measurement data collecting system in the fourth embodiment. FIG. 11 is a diagram illustrating an exemplary entire configuration of the measurement data collecting system in the fourth embodiment.

As illustrated in FIG. 11, the measurement data collecting system 100 in the fourth embodiment includes the same devices included in the measurement data collecting system 100 described with reference to FIG. 7 in the second embodiment. FIG. 11 differs from FIG. 7 with regard to functions of a server device 1100.

As illustrated in FIG. 11, the server device 1100 includes a correction condition determining unit 1101 in addition to the functions of the server device 700 illustrated in FIG. 7. The server device 1100 also includes a correction condition information storage unit 1110 in addition to the storage units included in the server device 700 illustrated in FIG. 7. A functional configuration of the server device 1100 is described below in detail with reference to FIG. 12.

2. Functional Configuration of Server Device

Figure 12:
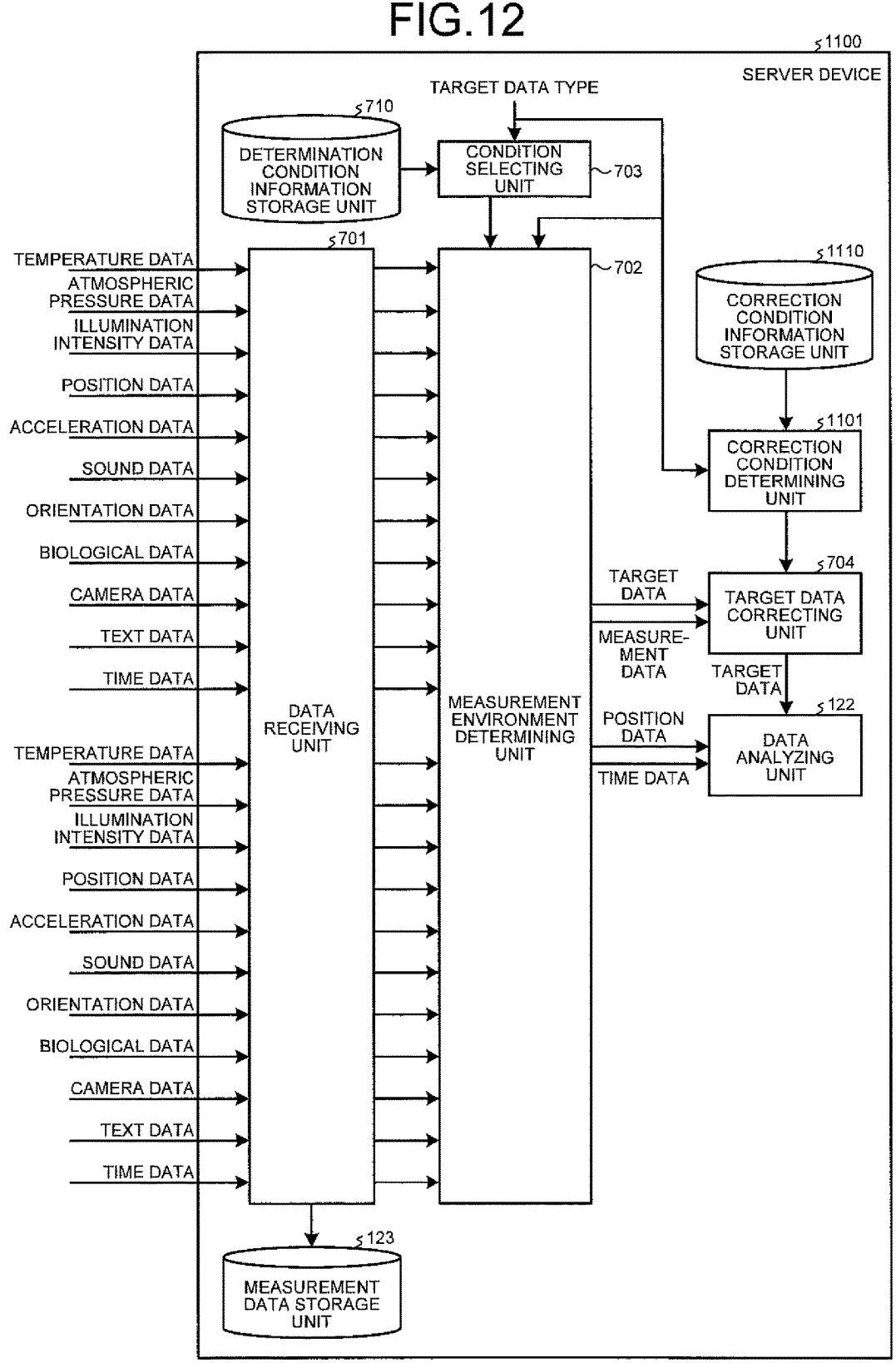
FIG. 12 is a diagram illustrating an exemplary functional configuration of the server device.

FIG. 12 is a diagram illustrating an exemplary functional configuration of the server device 1100 in the fourth embodiment. As illustrated in FIG. 12, the server device 1100 includes the correction condition determining unit 1101 in addition to the data receiving unit 701, the measurement environment determining unit 702, the condition selecting unit 703, the target data correcting unit 704, and the data analyzing unit 122. The server device 1100 also includes the correction condition information storage unit 1110 in addition to the measurement data storage unit 123 and the determination condition information storage unit 710.

Description has already been given on the data receiving unit 701, the measurement environment determining unit 702, the condition selecting unit 703, and the data analyzing unit 122, and thus will be omitted in the following.

When the type of target data in accordance with an analysis purpose is specified by the analyst, the correction condition determining unit 1101 receives the specified type of the target data. Then, the correction condition determining unit 1101 reads, from the correction condition information storage unit 1110, correction condition information indicating a correction condition for correcting target data of the specified type, and notifies the target data correcting unit 704 of this correction condition information.

The target data correcting unit 704 receives the target data notified by the measurement environment determining unit 702. The target data correcting unit 704 also acquires measurement data for determining necessity for the correction from the measurement environment determining unit 702 based on the correction condition information notified by the correction condition determining unit 1101.

Then, the target data correcting unit 704 determines necessity for the correction on the target data based on the measurement data for determining necessity for the correction. If it is determined that the correction is needed, the target data correcting unit 704 corrects the target data. The target data correcting unit 704 corrects the target data by using the measurement data acquired from the measurement environment determining unit 702.

Then, the target data correcting unit 704 notifies the data analyzing unit 122 of the corrected target data.

3. Description of Determination Condition Information and Correction Condition Information The following describes the determination condition information stored in the determination condition information storage unit 710 and the correction condition information stored in the correction condition information storage unit 1110.

Figure 13A:
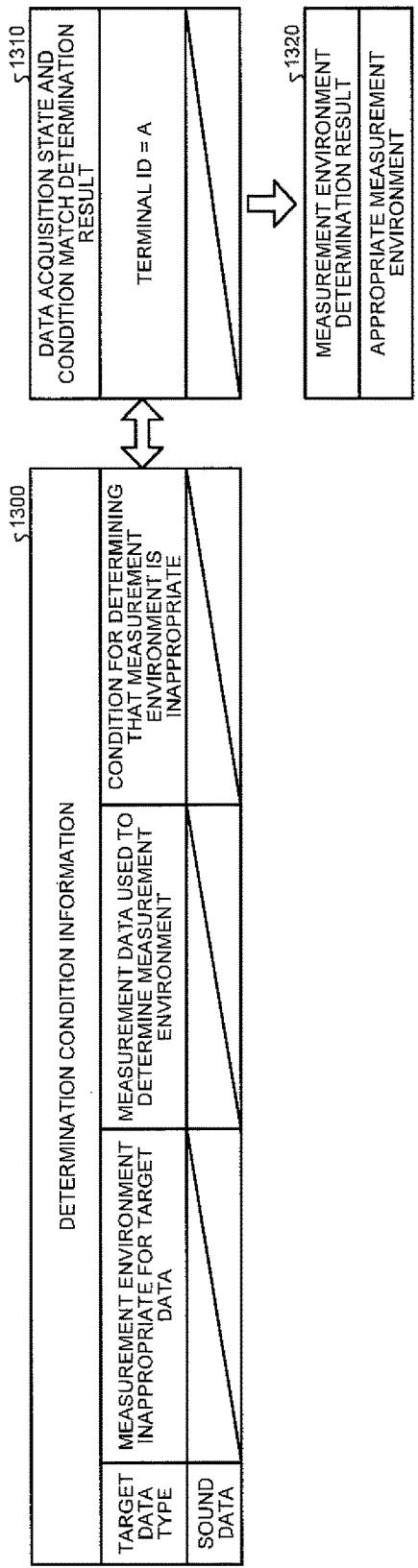
FIGS. 13A and 13B are each a diagram illustrating exemplary determination condition information and correction condition information.
Figure 13B:
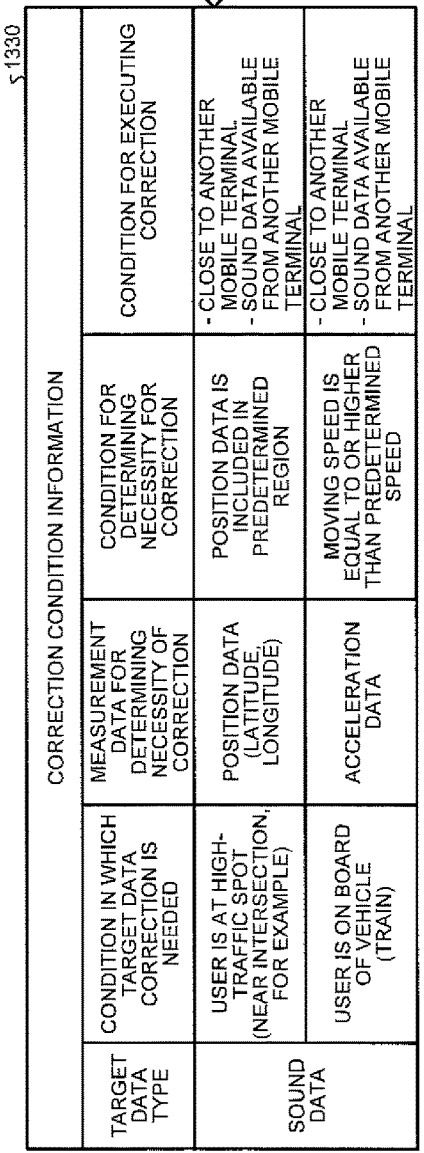

FIGS. 13A and 13B are each a diagram illustrating exemplary determination condition information and exemplary correction condition information. Determination condition information 1300 illustrated in FIG. 13A is the determination condition information read by the condition selecting unit 703 when the type of target data in accordance with an analysis purpose is "sound data". For sake of simplicity, FIG. 13A omits definitions of "Measurement Environment Inappropriate For Target Data", "Measurement Data Used To Determine Measurement Environment", and "Condition For Determining That Measurement Environment Is Inappropriate". Thus, a measurement environment determination result 1320 illustrated on a right side in FIG. 13A is a determination result when sound data acquired at the mobile terminal 110_1 with the terminal ID "A" shown in data acquisition state and condition match determination result 1310 is determined to be measured under appropriate measurement environment.

Correction condition information 1330 illustrated in FIG. 13B is the correction condition information read by the correction condition determining unit 1101 when the type of target data in accordance with an analysis purpose is "sound data".

As illustrated in FIG. 13B, the correction condition information 1330 includes, as information items, "Target Data Type", "Condition In Which Target Data Correction Is Needed", "Measurement Data For Determining Necessity For Correction", "Condition For Determining Necessity For Correction", "Condition For Executing Correction".

The item "Target Data Type" stores therein information corresponding to the type of the target data in accordance with an analysis purpose. The correction condition information 1330 illustrated in FIG. 13B indicates that the type of the target data in accordance with an analysis purpose is sound data.

The item "Condition In Which Target Data Correction Is Needed" stores therein information on a condition in which the target data needs to be corrected. In the example in FIG. 13B, information on a condition in which sound data needs to be corrected includes "the user is at a high-traffic spot (near an intersection, for example)" and "the user is on board of a vehicle (train)". When the user is at a high-traffic spot (near an intersection, for example) or on board of a vehicle such as a train, sound other than voice of the user is measured as background noise. Thus, sound data measured under such measurement environment needs to be corrected.

The item "Measurement Data For Determining Necessity For Correction" defines measurement data for determining whether the target data matches "Condition In Which Target Data Correction Is Needed".

Specifically, the determination of whether the user is at a high-traffic spot is performed by the target data correcting unit 704 based on the position data detected by the built-in GPS sensor included in the mobile terminal 110_1. The determination of whether the user is in a vehicle is performed based on the acceleration data measured by the built-in acceleration sensor included in the mobile terminal 110_1.

The item "Condition For Determining Necessity For Correction" defines a condition for determining that a correction is needed based on measurement data defined by "Measurement Data For Determining Necessity For Correction".

Specifically, the determination of whether the user is at a high-traffic spot is performed by the target data correcting unit 704 based on whether the position data is included in a predetermined region. If it is determined that the position data is included in the predetermined region, the target data correcting unit 704 determines that the user is at a high-traffic spot. If it is determined that the position data is not included in the predetermined region, the target data correcting unit 704 determines that the user is not at a high-traffic spot.

The determination of whether the user is in a vehicle is performed based on whether the moving speed of the user calculated based on the acceleration data is equal to or higher than a predetermined speed. If it is determined that the moving speed of the user is equal to or higher than the predetermined speed, the target data correcting unit 704 determines that the user is in a vehicle. If it is determined that the moving speed of the user is lower than the predetermined speed, the target data correcting unit 704 determines that the user is not in a vehicle.

In this manner, the correction condition information 1330 can be used to determine whether the target data extracted by the measurement environment determining unit 702 needs to be corrected, based on measurement data other than the target data.

The item "Condition For Executing Correction" defines a condition for determining whether a correction is possible when it is determined that the target data needs to be corrected. Specifically, examples of the defined condition include "a mobile terminal at which the target data is acquired is positioned close to another mobile terminal" and "sound data is acquired from the other mobile terminal". If a mobile terminal at which the target data is acquired is positioned close to another mobile terminal and sound data is acquired from the other mobile terminal, a correction can be executed that removes background noise of sound data as the target data using the sound data of the other mobile terminal.

A condition match determination result 1340 illustrated on a right side in FIG. 13B illustrates an exemplary result of the determination by the target data correcting unit 704 based on the correction condition information 1330.

According to the condition match determination result 1340, the target data correcting unit 704 determines that the position data transmitted from the mobile terminal 110_1 is included in a predetermined region (matches a condition for the necessity for a correction).

According to the condition match determination result 1340, the target data correcting unit 704 determines that the mobile terminal 110_1 is positioned close to the mobile terminal 110_2, and that sound data transmitted from the mobile terminal 110_2 is acquired (matches a condition for executing a correction).

According to the condition match determination result 1340, the target data correcting unit 704 determines that the moving speed calculated based on the acceleration data transmitted from the mobile terminal 110_1 is lower than the predetermined speed (does not match a condition for the necessity for a correction). If it is determined that the calculated moving speed does not match a condition for the necessity for a correction, the target data correcting unit 704 does not perform the determination of whether the target data matches a condition for executing a correction.

If it is determined that the target data matches any one of conditions defined by "Condition For Determining Necessity For Correction" and matches "Condition For Executing Correction" defined for this matched condition for the necessity for a correction, the target data correcting unit 704 corrects the target data.

Specifically, the target data correcting unit 704 provides the target data with a correction in accordance with a determination result based on the correction condition information 1330. In the example in FIG. 13B, the target data correcting unit 704 performs a correction on sound data by extracting the sound data acquired at the mobile terminal 110_2 and uses the sound data to correct the sound data as the target data acquired at the mobile terminal 110_1.

In this example, the user possessing the mobile terminal 110_2 is positioned close to the user possessing the mobile terminal 110_1 (in other words, at the same intersection) but is not speaking, and thus only sound data as background noise is acquired.

Thus, the target data correcting unit 704 can correct the sound data acquired by the mobile terminal 110_1 by subtracting the sound data acquired by the mobile terminal 110_2 from sound data as the target data acquired by the mobile terminal 110_1. Accordingly, the uttered content by the user possessing the mobile terminal 110_1 can be extracted from the sound data as the target data.

4. Process of Measurement Data Collecting Processing

Figure 14:
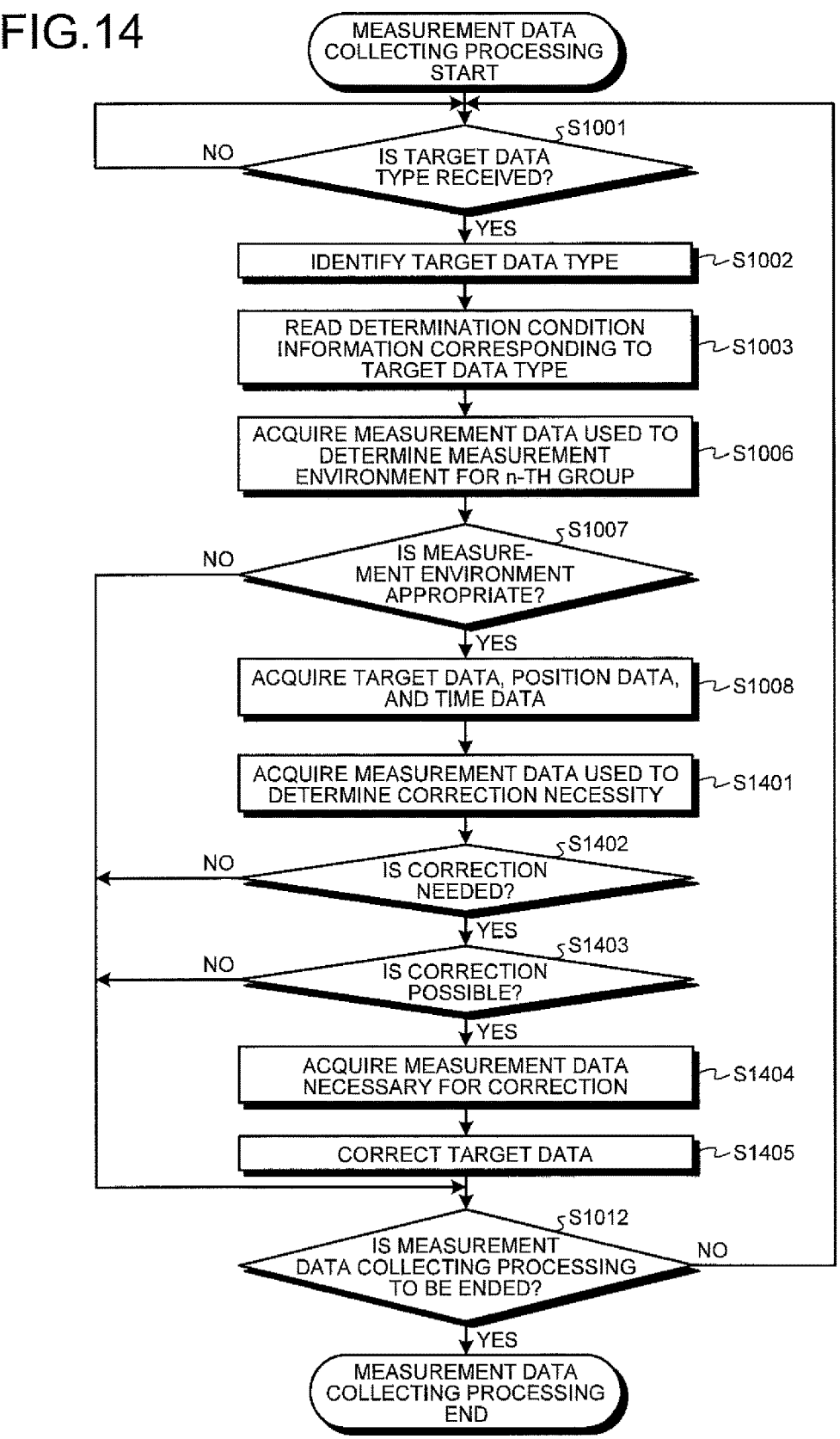
FIG. 14 is a flowchart of the measurement data collecting processing.

The following describes the process of the measurement data collecting processing executed by the server device 120. FIG. 14 is a flowchart of the measurement data collecting processing executed by the server device 120. Any step being the same as a step of the measurement data collecting processing illustrated in FIG. 10 is denoted by the same reference sign, and description thereof will be omitted.

The process of the measurement data collecting processing differs from the process of the measurement data collecting processing illustrated in FIG. 10 mainly for steps S1401 to S1405.

At step S1401, the correction condition determining unit 1101 reads the correction condition information 1330 in accordance with the type of the target data and notifies the target data correcting unit 704 of this correction condition information 1330. Then, the target data correcting unit 704 acquires measurement data used in the correction necessity determination by referring to the correction condition information 1330.

At step S1402, the target data correcting unit 704 determines, by referring to the correction condition information 1330, whether the measurement data used to determine the necessity for correction satisfies a condition for determining the necessity for a correction (whether a correction is needed).

At step S1402, if it is determined that a correction is not needed, the process proceeds to step S1012. If it is determined that a correction is needed, the process proceeds to step S1403.

At step S1403, the target data correcting unit 704 acquires, by referring to the correction condition information 1330, measurement data used to determine correction executability from the measurement environment determining unit 702. Then, the target data correcting unit 704 determines whether the measurement data used to determine correction executability satisfies a condition for executing a correction (whether a correction on the target data is possible).

At step S1403, if it is determined that a correction is impossible, the process proceeds to step S1012. If it is determined that a correction is possible, the process proceeds to step S1404.

At step S1404, the target data correcting unit 704 acquires measurement data necessary for a correction from the measurement environment determining unit 702. At step S1405, the target data correcting unit 704 corrects the target data using the measurement data necessary for a correction.

5. Summary

As described above, the measurement data collecting system in the present embodiment corrects target data using measurement data acquired at a plurality of mobile terminals. Accordingly, the present embodiment enables an analysis at the server device using the target data with higher accuracy.

Other Embodiments

The fourth embodiment describes the exemplary correction of target data by the target data correcting unit 704, in which background noise of sound data is removed. However, the exemplary correction of the target data by the target data correcting unit 704 is not limited thereto. For example, if the target data is atmospheric pressure data, the atmospheric pressure data may be corrected based on position data (altitude data). Alternatively, if the target data is camera data, the white balance of this camera data may be corrected based on illumination intensity data.

The correction of the target data by the target data correcting unit 704 may be performed based on predetermined correction data instead of being performed based on other measurement data. For example, the correction to remove background noise of sound data may be performed using correction data registered as background noise in advance instead of using sound data transmitted from another mobile terminal.

In the first to the fourth embodiments, predetermined request information is transmitted to a mobile terminal. However, the embodiments are not limited thereto, and the request information may be generated in accordance with the content of an analysis at the server device. Each time the request information is newly generated, the determination condition information may be generated in accordance with the newly generated request information. Alternatively, each time the request information is newly generated, the determination condition information may be generated in accordance with the newly generated request information. The newly generated determination condition information may be transmitted to a mobile terminal.

A measurement sensor used in the measurement data collecting system 100 is not limited to the measurement sensors described in the first to the fourth embodiments, and other measurement sensors may be used.

A terminal device used in the measurement data collecting system 100 is not limited to the mobile terminals described in the first to the fourth embodiments, and any terminal device (for example, a car navigation device) other than the mobile terminals may be used.

In the measurement data collecting system 100, distribution of the functions of a mobile terminal and the functions of the server device is not limited to the distribution described in the first to the fourth embodiments. For example, the server device may have part of the functions of the mobile terminal in the description. Alternatively, the mobile terminal may have part of the functions of the server device in the description.

The embodiments are not limited to the configurations described in the above-described embodiments or their combination with other elements. These configurations can be changed without departing from the scope of the embodiments and determined as appropriate depending on an application of the embodiments.

Measurement data can be collected in accordance with an analysis purpose in a measurement data collecting system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device that communicates with a server device, the terminal device comprising:
a processor programmed to:
receive request information that is transmitted by the server device, the request information requesting measurement data of a predetermined type;
identify an environment in which the measurement data of the predetermined type can be measured;
receive first data that is measurement data of the predetermined type, the first data having been measured by a first sensor, the first data including at least one of temperature data, atmospheric pressure data, illumination intensity data, position data, acceleration data, sound data, biological data, and text data;
receive second data that is measured by a second sensor different from the first sensor;
determine an environment of the terminal device at a time during which the first data is measured based on the received second data;

compare the determined environment of the terminal device with the identified environment; and when the determined environment of the terminal device matches the identified environment, cause a transmitter to transmit the received first data the server device.

2. A server device, comprising:
a processor programmed to:
identify an environment in which first data can be measured, the first data including at least one of temperature data, atmospheric pressure data, illumination intensity data, position data, acceleration data, sound data, biological data, and text data;
receive the first data that is measured by a first sensor and acquired at a terminal device;
receive second data that is measured by a second sensor different from the first sensor and acquired at the terminal device;
determine an environment of the terminal device at a time during which the first data is acquired based on the received second data;
compare the determined environment of the terminal device with the identified environment; and
when the determined environment of the terminal device matches the identified environment, extracts data from the received first data.

3. A server device, comprising:
a processor programmed to:
identify an environment in which first data can be measured, the first data including at least one of temperature data, atmospheric pressure data, illumination intensity data, position data, acceleration data, sound data, biological data, and text data;
receive the first data that is measured by a first sensor and acquired at a terminal device;
identify a second terminal device at a position in a predetermined range from a position of the first terminal device;
receive second data that is measured by a second sensor and acquired at the identified second terminal device;
determine an environment of the terminal device at a time during which the first data is acquired based on the received second data;
compare the determined environment of the terminal device with the identified environment; and
when the determined environment of the terminal device matches the identified environment, extracts data from the received first data.

4. A non-transitory computer-readable storage medium having stored therein a computer program that causes a terminal device that communicates with a server device to execute a process comprising:
receiving request information that is transmitted by the server device, the request information requesting measurement data of a predetermined type;
identifying an environment in which the measurement data of the predetermined type can be measured;
receiving first data that is measurement data of the predetermined type, the first data having been measured by a first sensor, the first data including at least one of temperature data, atmospheric pressure data, illumination intensity data, position data, acceleration data, sound data, biological data, and text data;
receiving second data that is measured by a second sensor different from the first sensor;
determining an environment of the terminal device at a time during which the first data is measured based on the received second data;
comparing the determined environment of the terminal device with the identified environment; and
when the determined environment of the terminal device matches the identified environment, transmitting, the received first data to the server device.

5. A non-transitory computer-readable storage medium having stored therein a computer program that causes a server device to execute a process comprising:
identifying an environment in which first data can be measured, the first data including at least one of temperature data, atmospheric pressure data, illumination intensity data, position data, acceleration data, sound data, biological data, and text data;
receiving the first data that is measured by a first sensor and acquired at a terminal device;
receiving second data that is measured by a second sensor different from the first sensor and acquired at the terminal device;
determining an environment of the terminal device at a time during which the first data is acquired based on the received second data;
comparing the determined environment of the terminal device with the identified environment; and
when the determined environment of the terminal device matches the identified environment, extracting data from the received first data.

6. A non-transitory computer-readable storage medium having stored therein a computer program that causes a server device to execute a process comprising:
identifying an environment in which first data can be measured, the first data including at least one of temperature data, atmospheric pressure data, illumination intensity data, position data, acceleration data, sound data, biological data, and text data;
receiving the first data that is measured by a first sensor and acquired at a terminal device;
identifying a second terminal device at a position in a predetermined range from a position of the first terminal device;
receive second data that is measured by a second sensor and acquired at the identified second terminal device;
determining an environment of the terminal device at a time during which the first data is acquired based on the received second data;
comparing the determined environment of the terminal device with the identified environment; and
when the determined environment of the terminal device matches the identified environment, extracting data from the received first data.

* * * * *